US011390794B2

(12) United States Patent
Bittner et al.

(10) Patent No.: US 11,390,794 B2
(45) Date of Patent: Jul. 19, 2022

(54) ROBUST ALKYL ETHER SULFATE MIXTURE FOR ENHANCED OIL RECOVERY

(71) Applicant: BASF SE, Ludwigshafen am Rhein (DE)

(72) Inventors: Christian Bittner, Ludwigshafen am Rhein (DE); Ashok Kumar Mishra, Singapore (SG); Kathrin Cohen, Ludwigshafen am Rhein (DE); Clara Maria Hernandez Morales, Ludwigshafen am Rhein (DE); Prapas Lohateeraparp, Houston, TX (US); Hans-Christian Raths, Düsseldorf-Holthausen (DE); Michael Bueschel, Ludwigshafen am Rhein (DE); Gabriela Alvarez Juergenson, Ludwigshafen am Rhein (DE); Thomas Altmann, Ludwigshafen am Rhein (DE); Benjamin Wenzke, Hamburg (DE)

(73) Assignee: BASF SE, Ludwigshafen am Rhein (DE)

( * ) Notice: Subject to any disclaimer, the term of this patent is extended or adjusted under 35 U.S.C. 154(b) by 7 days.

(21) Appl. No.: 16/648,270

(22) PCT Filed: Sep. 19, 2018

(86) PCT No.: PCT/EP2018/075345
§ 371 (c)(1),
(2) Date: Mar. 18, 2020

(87) PCT Pub. No.: WO2019/057769
PCT Pub. Date: Mar. 28, 2019

(65) Prior Publication Data
US 2020/0216747 A1    Jul. 9, 2020

(30) Foreign Application Priority Data
Sep. 21, 2017 (EP) .................................. 17192299

(51) Int. Cl.
C09K 8/584 (2006.01)
(52) U.S. Cl.
CPC .................... C09K 8/584 (2013.01)
(58) Field of Classification Search
None
See application file for complete search history.

(56) References Cited

U.S. PATENT DOCUMENTS

| | | | |
|---|---|---|---|
| 4,979,564 A | 12/1990 | Kalpakci et al. | |
| 5,741,947 A | 4/1998 | Wolf et al. | |
| 7,700,702 B2 | 4/2010 | Gaillard et al. | |
| 8,053,396 B2 | 11/2011 | Huff et al. | |
| 9,777,094 B2 | 10/2017 | Bittner et al. | |
| 2011/0220353 A1* | 9/2011 | Bittner | C09K 8/584 166/270.1 |
| 2012/0125606 A1* | 5/2012 | Reichenbach-Klinke | C09K 8/584 166/270.1 |
| 2014/0116689 A1* | 5/2014 | Bittner | C09K 8/584 166/270.1 |
| 2016/0215200 A1* | 7/2016 | Barnes | C09K 8/584 |
| 2017/0114270 A1* | 4/2017 | Ravikiran | C09K 8/584 |
| 2017/0355897 A1* | 12/2017 | Bittner | C09K 8/86 |

FOREIGN PATENT DOCUMENTS

| | | |
|---|---|---|
| CA | 2760734 A1 | 11/2010 |
| CA | 2774318 A1 | 4/2011 |
| CA | 2790159 A1 | 9/2011 |
| CA | 2791119 A1 | 9/2011 |
| DE | 4325237 A1 | 2/1995 |
| DE | 10243361 A1 | 4/2004 |
| EP | 2432807 A2 | 3/2012 |
| WO | WO-2006131541 A1 | 12/2006 |
| WO | WO-2010133527 A2 | 11/2010 |
| WO | WO-2011045254 A1 | 4/2011 |

(Continued)

OTHER PUBLICATIONS

International Preliminary Examination Report for PCT/EP2018/075345 dated Dec. 16, 2019 with Applicant amendments in response to IPRP.
International Search Report for PCT/EP2018/075345 dated Nov. 7, 2018.
Written Opinion of the International Searching Authority for PCT/EP2018/075345 dated Nov. 7, 2018.
D. G. Kessel, "Chemical flooding—status report", J. Pet. Sci. Eng., vol. 2, 1989, pp. 81-101.
Melrose et al., "Role of Capillary Forces In Detennining Microscopic Displacement Efficiency For Oil Recovery By Waterflooding", J. Can. Pet. Tech , vol. 13, 1974, pp. 54-62.

(Continued)

Primary Examiner — John J Figueroa
(74) Attorney, Agent, or Firm — Faegre Drinker Biddle & Reath LLP

(57) ABSTRACT

The invention relates to a process for mineral oil production, in which an aqueous saline surfactant formulation comprising a surfactant mixture of at least one anionic surfactant of the general formula $R^1-O-(CH_2C(CH_3)HO)_x-(CH_2CH_2O)_y-SO_3M$ and at least one anionic surfactant of the general formula $R^2-O-(CH_2CH_2O)_z-SO_3M$ and a base is injected through injection boreholes into a mineral oil deposit, and crude oil is withdrawn from the deposit through production boreholes. The invention further relates to the surfactant mixture, a concentrate comprising the surfactant mixture and a manufacturing process as well as the use of the surfactant mixture and the con- centrate in the production of mineral oil from underground mineral oil deposits.

16 Claims, No Drawings

(56) References Cited

FOREIGN PATENT DOCUMENTS

| WO | WO-2011110502 A1 | 9/2011 |
| WO | WO-2011110503 A1 | 9/2011 |
| WO | WO-2014095621 A1 | 6/2014 |

OTHER PUBLICATIONS

Taylor et al., "Water-soluble hydrophobically associating polymers for improved oil recovery: A literature review", J. Petr. Sci. Eng., vol. 19, 1998, pp. 265-280.

Weggen et al., "Oil and Gas", pp. 37 ff., Ullmann's Encyclopedia of Industrial Chemistry, Online Edition, Wiley-VCH, Weinheim, vol. 25, 2010, pp. 121-205.

Zhang et al., "Favorable Attributes of Alkali-Surfactant-Polymer Flooding", SPE-Paper No. 99744.

\* cited by examiner

ROBUST ALKYL ETHER SULFATE MIXTURE FOR ENHANCED OIL RECOVERY

CROSS-REFERENCE TO RELATED APPLICATIONS

This application is a national stage application (under 35 U.S.C. § 371) of PCT/EP2018/075345, filed Sep. 19, 2018, which claims benefit of European Application No. 17192299.0, filed Sep. 21, 2017, both of which are incorporated herein by reference in their entirety.

The present invention relates to a process for mineral oil production, in which an aqueous saline surfactant formulation, for the purpose of lowering the interfacial tension between oil and water to <0.1 mN/m at deposit temperature, is injected through injection boreholes (injection wells) into a mineral oil deposit, and crude oil is withdrawn from the deposit through production bore-holes (production wells). The aqueous saline surfactant formulation comprises a surfactant mixture at least one anionic surfactant of the general formula $R^1$—O—$(CH_2C(CH_3)HO)_x$-$(CH_2CH_2O)_y$—$SO_3M$ and at least one anionic surfactant of the general formula $R^2$—O—$(CH_2CH_2O)_z SO_3M$ where a ratio of anionic surfactant (A) to anionic surfactant (B) of 99:1 to 51:49 by weight is present in the surfactant mixture. The present invention further relates to the surfactant mixture, a concentrate out of the surfactant mixture and a manufacturing process as well as the use of the surfactant mixture and the concentrate in the production of mineral oil from underground mineral oil deposits.

In natural mineral oil deposits, mineral oil is present in the cavities of porous reservoir rocks which are sealed toward the surface of the earth by impervious overlying strata. The cavities may be very fine cavities, capillaries, pores or the like. Fine pore necks may have, for example, a diameter of only about 1 μm. As well as mineral oil, including fractions of natural gas, a deposit generally also comprises water with a greater or lesser salt content.

If a mineral oil deposit has a sufficient autogenous pressure, after drilling of the deposit has commenced, mineral oil flows through the well to the surface of its own accord because of the autogenous pressure (primary mineral oil production). Even if a sufficient autogenous pressure is present at first, however, the autogenous pressure of the deposit generally declines relatively rapidly in the course of withdrawal of mineral oil, and so usually only small amounts of the amount of mineral oil present in the deposit can be produced in this manner, according to the deposit type.

Therefore, when primary production declines, a known method is to drill further wells into the mineral oil-bearing formation in addition to the wells which serve for production of the mineral oil, called the production wells. Through these so-called injection wells, water is injected into the deposit in order to maintain the pressure or increase it again. The injection of the water forces the mineral oil through the cavities in the formation, proceeding gradually from the injection well in the direction of the production well. This technique is known as water flooding and is one of the techniques of what is called secondary oil production. In the case of water flooding, however, there is always the risk that the mobile water will not flow homogeneously through the formation and in doing so mobilize oil, but will flow from the injection well to the production well, particularly along paths with a low flow resistance, without mobilizing oil, while there is only little flow, if any, through regions in the formation with high flow resistance. This is discerned from the fact that the proportion of the water which is produced via the production well increases ever further. By means of primary and secondary production, generally not more than about 30% to 35% of the amount of mineral oil present in the deposit can be produced.

A known method is to use techniques for tertiary mineral oil production (also known as "Enhanced Oil Recovery (EOR)") to enhance the oil yield, if economically viable production is impossible or no longer possible by means of primary or secondary mineral oil production. Tertiary mineral oil production includes processes in which suitable chemicals, such as surfactants and/or polymers, are used as auxiliaries for oil production. An overview of tertiary oil production using chemicals can be found, for example, in the article by D. G. Kessel, Journal of Petroleum Science and Engineering, 2 (1989) 81-101.

One of the techniques of tertiary mineral oil production is called "polymer flooding". Polymer flooding involves injecting an aqueous solution of a thickening polymer into the mineral oil deposit through the injection wells, the viscosity of the aqueous polymer solution being matched to the viscosity of the mineral oil. The injection of the polymer solution, as in the case of water flooding, forces the mineral oil through said cavities in the formation from the injection well proceeding in the direction of the production well, and the mineral oil is produced through the production well. By virtue of the polymer formulation having about the same viscosity as the mineral oil, the risk that the polymer formation will break through to the production well with no effect is reduced. Thus, the mineral oil is mobilized much more homogeneously than when water, which is mobile, is used, and additional mineral oil can be mobilized in the formation.

Use of hydrophobically associating copolymers for polymer flooding is known. "Hydrophobically associating copolymers" are understood by those skilled in the art to mean water-soluble polymers having lateral or terminal hydrophobic groups, for example relatively long alkyl chains. In an aqueous solution, such hydrophobic groups can associate with themselves or with other substances having hydrophobic groups. This results in formation of an associative network which causes (additional) thickening action. Details of the use of hydrophobically associating copolymers for tertiary mineral oil production are described, for example, in the review article by Taylor, K. C. and Nasr-El-Din, H. A. in J. Petr. Sci. Eng. 1998, 19, 265-280.

A further form of tertiary mineral oil production is surfactant flooding for the purpose of producing the oil trapped in the pores by capillary forces, usually combined with polymer flooding for mobility control (homogeneous flow through the deposit).

Viscous and capillary forces act on the mineral oil which is trapped in the pores of the deposit rock toward the end of the secondary production, the ratio of these two forces relative to one another determining the microscopic oil removal. A dimensionless parameter, called the capillary number, is used to describe the action of these forces. It is the ratio of the viscosity forces (velocity x viscosity of the forcing phase) to the capillary forces (interfacial tension between oil and water x wetting of the rock):

$$N_c = \frac{\mu v}{\sigma \cos \theta}.$$

In this formula, μ is the viscosity of the fluid mobilizing the mineral oil, v is the Darcy velocity (flow per unit area), σ is the interfacial tension between liquid mobilizing mineral oil and mineral oil, and θ is the contact angle between mineral oil and the rock (C. Melrose, C. F. Brandner, J. Canadian Petr. Techn., October-December, 1974, pages 54-62). The higher the capillary number, the greater the mobilization of the oil and hence also the degree of oil removal.

It is known that the capillary number toward the end of secondary mineral oil production is in the region of about $10^{-6}$ and that it is necessary for the mobilization of additional mineral oil to increase the capillary number to about $10^{-3}$ to $10^{-2}$.

For this purpose, it is possible to conduct a particular form of the flooding method—what is known as Winsor type III microemulsion flooding. In Winsor type III microemulsion flooding, the injected surfactants are supposed to form a Winsor type III microemulsion with the water phase and oil phase present in the deposit. A Winsor type III microemulsion is not an emulsion with particularly small droplets, but rather a thermodynamically stable, liquid mixture of water, oil and surfactants. The three advantages thereof are that a very low interfacial tension σ between mineral oil and aqueous phase is thus achieved, it generally has a very low viscosity and as a result is not trapped in a porous matrix, it forms with even the smallest energy inputs and can remain stable over an infinitely long period (conventional emulsions, in contrast, require high shear forces which predominantly do not occur in the reservoir, and are merely kinetically stabilized).

The Winsor type III microemulsion is in equilibrium with excess water and excess oil. Under these conditions of microemulsion formation, the surfactants cover the oil-water interface and lower the interfacial tension σ more preferably to values of <$10^{-2}$ mN/m (ultra-low interfacial tension). In order to achieve an optimal result, the proportion of the microemulsion in the water-microemulsion-oil system, for a defined amount of surfactant, should naturally be at a maximum, since this allows lower interfacial tensions to be achieved.

In this manner, it is possible to alter the form of the oil droplets (the interfacial tension between oil and water is lowered to such a degree that the smallest interface state is no longer favored and the spherical form is no longer preferred), and they can be forced through the capillary openings by the flooding water.

When all oil-water interfaces are covered with surfactant, in the presence of an excess amount of surfactant, the Winsor type III microemulsion forms. It thus constitutes a reservoir for surfactants which cause a very low interfacial tension between oil phase and water phase. By virtue of the Winsor type III microemulsion having a low viscosity, it also migrates through the porous deposit rock in the flooding process. Emulsions, in contrast, may remain suspended in the porous matrix and block deposits. If the Winsor type III microemulsion meets an oil-water interface as yet uncovered with surfactant, the surfactant from the microemulsion can significantly lower the interfacial tension of this new interface and lead to mobilization of the oil (for example by deformation of the oil droplets).

The oil droplets can subsequently combine to give a continuous oil bank. This has two advantages:

Firstly, as the continuous oil bank advances through new porous rock, the oil droplets present there can coalesce with the bank.

Moreover, the combination of the oil droplets to give an oil bank significantly reduces the oil-water interface and hence surfactant no longer required is released again. Thereafter, the surfactant released, as described above, can mobilize oil droplets remaining in the formation.

Winsor type III microemulsion flooding is consequently an exceptionally efficient process, and requires much less surfactant compared to an emulsion flooding process. In microemulsion flooding, the surfactants are typically optionally injected together with cosolvents and/or basic salts (optionally in the presence of chelating agents). Subsequently, a solution of thickening polymer is injected for mobility control. A further variant is the injection of a mixture of thickening polymer and surfactants, cosolvents and/or basic salts (optionally with chelating agent), and then a solution of thickening polymer for mobility control. These solutions should generally be clear in order to prevent blockages of the reservoir.

The use parameters, for example type, concentration and mixing ratio of the surfactants used relative to one another, are adjusted by the person skilled in the art to the conditions prevailing in a given oil formation (for example temperature and salt content).

PRIOR ART

WO 2011/110 502 A1 describes the use of anionic surfactants of the $R^1$—O—$(CH_2C(CH_3)HO)_m(CH_2CH_2O)_n$—XY$^-$M$^+$ type, which are based on a linear saturated or unsaturated alkyl radical $R^1$ having 16 to 18 carbon atoms, in tertiary mineral oil production. Y$^-$ may be a sulfate group inter alia, and X may be an alkyl or alkylene group having up to 10 carbon atoms inter alia. In addition, m is a number from 0 to 99 and preferably 3 to 20, and n is a number from 0 to 99. These anionic surfactants can be obtained inter alia by reaction of appropriate alkoxylates with chlorosulfonic acid and sodium hydroxide.

WO 2011/110 503 A1 describes the use of anionic surfactants of the $R^1$—O—$(D)_n$—$(B)_m$—$(A)_l$—XY$^-$ M$^+$ type, which are based on a linear or branched saturated or unsaturated alkyl or alkylaryl radical $R^1$ having 8 to 30 carbon atoms, in tertiary mineral oil production. D stands for a butyleneoxy group, B stands for an propyleneoxy group, and A stands for a ethyleneoxy group. Y$^-$ may be a sulfate group inter alia, and X may be an alkyl or alkylene group having up to 10 carbon atoms inter alia. In addition, I is a number from 0 to 99, m is a number from 0 to 99, and n is a number from 1 to 99. These anionic surfactants can be obtained inter alia by reaction of appropriate alkoxylates with chlorosulfonic acid and sodium hydroxide.

WO 2011/045 254 A1 describes the use of anionic surfactants of the $R^1$—O—$(CH_2C(CH_3)HO)_x(CH_2CH_2O)_y$—$SO_3M$ type, which are based on a linear or branched saturated or unsaturated alkyl or alkylaryl radical $R^1$ having 8 to 32 carbon atoms, combined with surfactant of $R^2$—Y type, which are based on a linear or branched saturated or unsaturated alkyl or alkylaryl radical $R^2$ having 8 to 32 carbon atoms and are based on a hydrophilic group Y, in tertiary mineral oil production. In addition, x is a number from 4 to 30, and y is a number from 0 to 30 and $R^1$—O—$(CH_2C(CH_3)HO)_x(CH_2CH_2O)_y$—H is made by alkoxylation using double metal cyanide catalyst. These anionic surfactants can be obtained inter alia by reaction of appropriate alkoxylates with chlorosulfonic acid and sodium hydroxide.

D. L. Zhang et al. desribe in SPE-Paper No. 99744 (SPE=Society of Petroleum Engineers) the low salt tolerance of internal olefin sulfonates. E.g. an internal olefin sulfonate comprising 15 to 18 carbon atoms is soluble at 20° C. in a saline water comprising two weight percent of sodium chloride. If 0.1 weight percent of calcium chloride are added, then the olefin sulfonate precipitates. The internal olefin sulfonate comprising 15 to 18 carbon atoms is not soluble at 20° C. in a saline water comprising four weight percent of sodium chloride.

US 2016/0215200 A1 describes the combination of an alkyl propoxy sulfate with a second anionic surfactant out of the group of alkyl propoxy ethoxy sulfate or out of the group of alkyl ethoxy sulfate.

OBJECT OF THE INVENTION

There is a need for efficient oil recovery from deposits having saline deposit water and especially having deposit temperatures of below 90° C., preferably below 80° C. and most preferably below 70° C. with surfactant formulations having the following requirements:
surfactant stability; and/or
salt tolerance (water solubility even in the presence of many monovalent ions, but also polyvalent cations: for example saline water having divalent cations such as $Ca^{2+}$ and/or $Mg^{2+}$); and/or
low use concentrations (<1 percent of weight, preferably <0.5 percent by weight) in order to keep costs and material consumption low with a view to sustainability; and/or
virtually complete dissolution in a clear solution at reservoir temperature.

The main surfactant provides typically desired reduction of oil-water interfacial tension, but it is not clear soluble in injection water (at surface temperature) and at deposit temperature. In case, that main surfactant alone is not clear soluble at surface temperature, then one has to heat the injection water, which is energy intensive and costly. In case, that main surfactant alone is not clear soluble at reservoir temperature, then it can plug the porous media and thereby the injection area. Addition of a second surfactant can improve overall surfactant solubility (however, improved solubility usually does not go along with the desired reduction of oil-water interfacial tension: one effect is sacrificed by the other effect). In addition, during the flooding process ratio of main surfactant to second surfactant can change (e.g. due to selective adsorption or retention). Then, the solubility of the surfactant formulation has to be still given. For a surfactant mixture further requirements are important:
simple injection into the porous formation (due to virtually complete dissolution in a clear solution at reservoir temperature); and/or
good interaction of the surfactants with the crude oil in order to achieve sufficient reduction of interfacial tension between crude oil and water (in particular, in case of crude oils, which are rich in paraffin, it is hard to achieve); and/or
low interfacial tensions at deposit temperature with respect to crude oil (<0.1 mN/m, preferably <0.05 mN/m, more preferably <0.01 mN/m), even when using only one surfactant (or two very similar surfactants which differ only in a few aspects—for example small differences in the alkoxylation level); and/or
low adsorption of all surfactants at the rock surface and no or only minimum change of surfactant ratio due to selective adsorption or retention of one surfactant in the formulation; and/or
simple production process, in order to keep the costs of the surfactant formulation low (alkyl benzene sulfonates or olefin sulfonates can be made easily, but they usually show low salt tolerance (precipitation); Alkyl ether sulfates, alkyl ether carboxylates and alkyl ether sulfonates are much more salt tolerant. However, manufacturing of alkyl ether sulfonates involves much more steps, which makes alkyl ether sulfonates very expensive); and/or
supply form as surfactant concentrate which may be liquid at least 20° C. (this would obviate the need for melting of the concentrate or constant heating on site and should preferably have a viscosity of <5000 mPas at 50° C. and 10 $s^{-1}$ and a high active content in order to keep the transport costs and the energy consumption resulting from transport low; and/or
it should not have any environmentally harmful properties (alkylphenol ethoxylates or their degradation products are known to be able to act as endocrine disruptors).

In this context, particularly the attainment of low interfacial tensions of <0.1 mN/m and especially <0.05 mN/m, especially in case of paraffin-rich crude oils is difficult to achieve during the flooding process with a surfactant formulation.

The flooding process is an industrial scale process. Although the chemicals used are typically used only as dilute solutions, the volumes injected per day are high and the injection is typically continued over months and up to several years. The chemical requirement for an average oilfield may quite possibly be 5000 to 50 000 t of polymer per annum. For an economically viable process, therefore, a very high efficiency, i.e. effect per unit volume, is of great significance. Even a slight improvement in efficiency can lead to a significant improvement in economic viability. Consequently, lowering of the interfacial tension between oil and water to <0.1 mN/m with a low use concentration of surfactant is desirable (total amount of all surfactants should ideally account for <1 percent by weight and preferably <0.5 percent by weight of the aqueous surfactant-containing solution injected. The injected aqueous surfactant-containing solution is understood to mean what is called the injected surfactant slug. The surfactant slug fills a portion of the pore volume and may, as well as the surfactant, optionally comprise further additives, for example a thickening polymer. The desired portion of the pore volume may, for example, be between 2% and 60%, preferably between 3% and 25%).

There is therefore a need for robust surfactant mixtures comprising alkyl ether sulfates, which, in oil production under the abovementioned conditions, do not have at least some of the abovementioned disadvantages and/or fulfil a maximum number of the abovementioned properties or requirements.

GENERAL DESCRIPTION OF THE INVENTION

For the achievement of the above object, it has therefore been found that, surprisingly, the demands are met at least partly by a method for producing mineral oil from underground mineral oil deposits (optionally by means of Winsor type III microemulsion flooding), in which an aqueous saline surfactant formulation comprising a surfactant mixture, for the purpose of lowering the interfacial tension between oil and water to <0.1 mN/m, preferably lowered to <0.05 mM/m, at deposit temperature, is injected through at least one injection well into a mineral oil deposit and crude oil is withdrawn through at least one production well from the deposit, wherein the surfactant mixture comprises at least one anionic surfactant (A) of the general formula (I)

$$R^1—O—(CH_2C(CH_3)HO)_x—(CH_2CH_2O)_y—SO_3M \qquad (I)$$

and at least one anionic surfactant (B) of the general formula (II)

$$R^2—O—(CH_2CH_2O)_z—SO_3M \qquad (II),$$

where a ratio of anionic surfactant (A) to anionic surfactant (B) of 99:1 to 51:49 by weight is present in the surfactant mixture, where $R^1$ is a primary linear or branched, preferably linear, saturated or unsaturated, aliphatic hydrocarbyl radical having 16 to 18 carbon atoms;

$R^2$ is a primary linear or branched, preferably linear, saturated aliphatic hydrocarbyl radical having 12 to 17, preferably 12 to 14, carbon atoms;

M is Na, K, $NH_4$, or $NH(CH_2CH_2OH)_3$;

x is a number from 3 to 25;

y is a number from 0 to 20; and z is a number from 1 to 30;

where the sum total of x+y is a number from 3 to 35 and the x+y alkoxylate groups may be arranged in random distribution, in alternation or in blocks.

The aqueous saline surfactant formulation is understood to mean at least the surfactant mixture which is dissolved in saline water (for example during the injection operation). The saline water may, inter alia, be river water, seawater, water from an aquifer close to the deposit, so-called injection water, deposit water, so-called production water which is being reinjected again, or mixtures of the above-described waters. However, the saline water may also be that which has been obtained from a more saline water: for example partial desalination, depletion of the polyvalent cations or by dilution with fresh water or drinking water. The surfactant mixture can preferably be provided in a concentrate which, as a result of the preparation, may also comprise salt. This is detailed further in the paragraphs which follow.

Another aspect of the present invention is the surfactant mixture as described herein. Accordingly, a surfactant mixture is claimed, which comprises at least one anionic surfactant (A) of the general formula (I)

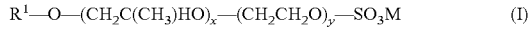
$$R^1—O—(CH_2C(CH_3)HO)_x—(CH_2CH_2O)_y—SO_3M \qquad (I)$$

and at least one anionic surfactant (B) of the general formula (II)

$$R^2—O—(CH_2CH_2O)_z—SO_3M \qquad (II),$$

where a ratio of anionic surfactant (A) to anionic surfactant (B) of 99:1 to 51:49 by weight is present in the surfactant mixture, where $R^1$ is a primary linear or branched, preferably linear, saturated or unsaturated, aliphatic hydrocarbyl radical having 16 to 18 carbon atoms;

$R^2$ is a primary linear or branched, preferably linear, saturated aliphatic hydrocarbyl radical having 12 to 17, preferably 12 to 14, carbon atoms;

M is Na, K, $NH_4$, or $NH(CH_2CH_2OH)_3$;

x is a number from 3 to 25;

y is a number from 0 to 20; and z is a number from 1 to 30;

where the sum total of x+y is a number from 3 to 35 and the x+y alkoxylate groups may be arranged in random distribution, in alternation or in blocks.

Further details are described in the following.

Accordingly, the present invention also relates to a method for producing a surfactant mixture of anionic surfactant (A) of the general formula (I) and anionic surfactant (B) of the general formula (II) as described herein, wherein anionic surfactant (A) and anionic surfactant (B) are made separately by alkoxylation of alcohols $R^1OH$ and $R^2OH$ in a vessel followed by sulphation with sulfur trioxide in a falling film reactor (including neutralization step afterwards) and mixed finally.

A further aspect of the present invention relates to a concentrate comprising the surfactant mixture as described herein and further comprising at least water and/or a cosolvent. Accordingly the concentrate comprises the surfactant mixture, which comprises at least one surfactant (A) and at least one surfactant (B) as described herein, and water or the concentrate comprises the surfactant mixture, which comprises at least one surfactant (A) and at least one surfactant (B) as described herein, and a cosolvent or the concentrate comprises the surfactant mixture, which comprises at least one surfactant (A) and at least one surfactant (B) as described herein, and water as well as a cosolvent.

It is clear to a practitioner in the art that a cosolvent is different from water as further described herein.

A further aspect of the present invention relates to the use of a surfactant mixture as described herein or a concentrate of the present invention in the production of mineral oil from underground mineral oil deposits.

FURTHER DETAILS OF THE INVENTION

The present invention relates to a method for producing mineral oil from underground mineral oil deposits (optionally by means of Winsor type III microemulsion flooding), in which an aqueous saline surfactant formulation comprising a surfactant mixture, for the purpose of lowering the interfacial tension between oil and water to <0.1 mN/m (preferably <0.05 mN/m) at deposit temperature, is injected through at least one injection well into a mineral oil deposit and crude oil is withdrawn through at least one production well from the deposit, wherein the surfactant mixture comprises at least one anionic surfactant (A) of the general formula (I)

$$R^1—O—(CH_2C(CH_3)HO)_x—(CH_2CH_2O)_y—SO_3M \qquad (I)$$

and at least one anionic surfactant (B) of the general formula (II)

$$R^2—O—(CH_2CH_2O)_z—SO_3M \qquad (II),$$

where a ratio of anionic surfactant (A) to anionic surfactant (B) of 99:1 to 51:49 by weight is present in the surfactant mixture, where $R^1$ is a primary linear or branched, preferably linear, saturated or unsaturated, aliphatic hydrocarbyl radical having 16 to 18 carbon atoms; and $R^2$ is a primary linear or branched, preferably linear, saturated aliphatic hydrocarbyl radical having 12 to 17, preferably 12 to 14, carbon atoms;

M is Na, K, $NH_4$, or $NH(CH_2CH_2OH)_3$;

x is a number from 3 to 25;

y is a number from 0 to 20;

z is a number from 1 to 30;

and where the sum total of x+y is a number from 3 to 35 and the x+y alkoxylate groups may be arranged in random distribution, in alternation or in blocks.

In the above-defined general formulae, x, y and z are each natural numbers including 0, i.e. 0, 1, 2 etc. However, it is clear to the person skilled in the art in the field of polyalkoxylates that this definition is the definition of a single surfactant in each case. In the case of the presence of surfactant mixtures or surfactant formulations comprising a plurality of surfactants of the general formula, the numbers x, y and z are each mean values over all molecules of the surfactants, since the alkoxylation of alcohol with ethylene oxide or propylene oxide in each case affords a certain distribution of chain lengths. This distribution can be described in a manner known in principle by what is called the polydispersity D. $D=M_w/M_n$ is the ratio of the weight-average molar mass and the number-average molar mass. The polydispersity can be determined by methods known to those skilled in the art, for example by means of gel permeation chromatography.

The alkyleneoxy groups may be arranged in random distribution, alternately or in blocks, i.e. in two, three, four or more blocks.

Preferably, the x propyleneoxy and y ethyleneoxy groups are at least partly arranged in blocks (in numerical terms, preferably to an extent of at least 50%, more preferably to an extent of at least 60%, even more preferably to an extent of at least 70%, more preferably to an extent of at least 80%, more preferably to an extent of at least 90%, especially completely).

In the context of the present invention, "arranged in blocks" means that at least one alkyleneoxy has a neighboring alkyleneoxy group which is chemically identical, such that these at least two alkyleneoxy units form a block.

More preferably, a sequence of blocks is arranged in that starting from $R^1$—O radical in formula (I) a propyleneoxy block with x propyleneoxy groups follows and finally an ethyleneoxy block with y ethyleneoxy groups.

The surfactant mixture comprises at least one anionic surfactant of formula (I) and at least one anionic surfactant of formula (II). However, the surfactant mixture typically comprises more than only one anionic surfactant of formula (I) and more than one anionic surfactant of formula (II) as explained above. The surfactant mixture can also comprise further surfactant different from surfactants (A) and (B). However, preferably the surfactant mixture consists of at least one anionic surfactant of formula (I) and at least one anionic surfactant of formula (II).

Preferably, the concentration of the surfactant mixture (all the surfactants together) is 0.03% to 0.99% by weight, preferably 0.05% to 0.49% by weight, based on the total amount of the aqueous saline surfactant formulation.

Preferably, $R^1$ is a primary linear, saturated or unsaturated, aliphatic hydrocarbyl radical having 16 to 18 carbon atoms. More preferably, $R^1$ is a primary linear, saturated aliphatic hydrocarbyl radical having 16 to 18 carbon atoms. Preferably, $R^2$ is a primary linear or branched saturated aliphatic hydrocarbyl radical having 12 to 14 carbon atoms. More preferably, $R^2$ is a primary linear saturated aliphatic hydrocarbyl radical having 12 to 14 carbon atoms. Preferably, M is Na. Preferably, x is a number from 3 to 15. Preferably, y is a number from 0 to 10. Preferably, z is a number from 1 to 5. Preferably, the sum total of x+y is a number from 3 to 25.

Preferably, $R^1$ is a primary linear, saturated, aliphatic hydrocarbyl radical having 16 to 18 carbon atoms; $R^2$ is a primary linear saturated aliphatic hydrocarbyl radical having 12 to 14 carbon atoms; M is Na; x is a number from 3 to 15; y is a number from 0 to 10; z is a number from 1 to 5; and the sum total of x+y is a number from 3 to 25.

In a further particular embodiment of the invention, $R^1$ is a mixture of primary linear, saturated aliphatic hydrocarbyl radical having 16 carbon atoms and of primary linear, saturated aliphatic hydrocarbyl radical having 18 carbon atoms, wherein hydrocarbyl radical having 16 carbon atoms to hydrocarbyl radical having 18 carbon atoms are preferably in a ratio of 20:80 to 40:60 on a molar basis.

In the surfactant mixture, the ratio of anionic surfactant (A) to anionic surfactant (B) is 99:1 to 51:49 by weight. As explained above the ratio may vary during the oil recovery process. Thus, the given ratio is to be understood as initial ratio, typically as given on injection. This initial ratio is also given for the method of producing the surfactant mixture and concentrates of the present invention.

In a preferred embodiment, the ratio of anionic surfactant (A) to anionic surfactant (B) is 95:5 to 55:45 by weight, more preferably 95:5 to 65:35 by weight, even more preferably of 95:5 to 75:25 by weight.

The method for producing mineral oil from underground mineral oil deposits (optionally by means of Winsor type III microemulsion flooding), comprises the injection of an aqueous saline surfactant formulation comprising a surfactant mixture, for the purpose of lowering the interfacial tension between oil and water to <0.1 mN/m at deposit temperature. Preferably, the interfacial tension between oil and water is lowered to <0.05 mN/m (even more preferably <0.01 mN/m) at deposit temperature.

In a preferred embodiment, the aqueous saline surfactant formulation comprises, in addition to the surfactant mixture, a base, which is preferably selected from the group of alkali hydroxides, such as sodium hydroxide or potassium hydroxide, or from group of carbonates, such as sodium carbonate or sodium bicarbonate, or from group of N-comprising compounds, such as ammonia, ethanolamine, diethanolamine, triethanolamine, choline hydroxide, or choline acetate. The term "base" also encompasses a mixture of different bases, like two or more of the bases mentioned.

In a further preferred embodiment, the aqueous saline surfactant formulation further comprises a thickening polymer, preferably from the group of the biopolymers or from the group of the copolymers based on acrylamide. The copolymers based on acrylamide may consist, for example, of the following units inter alia:

acrylamide and acrylic acid sodium salt,
  acrylamide and acrylic acid sodium salt and AMPS (2-acrylamido-2-ethylpropanesulfonic acid sodium salt).

In a further preferred embodiment, the underground mineral oil deposit consists out of sandstone and deposit temperature is below 90° C., preferably below 80° C. and most preferably below 70° C.

In a further preferred embodiment, the mixture of anionic surfactant (A) of the general formula (I) and anionic surfactant (B) of the general formula (II) is provided in the form of a concentrate comprising the surfactant mixture and at least water and/or a cosolvent, preferably comprising 50% by weight to 90% by weight of the surfactant mixture, 5% by weight to 30% by weight of water and 5% by weight to 20% by weight of a cosolvent, based on the total amount of the concentrate.

Accordingly in the method of producing mineral oil according to the present invention a formulation is preferably used, wherein the aqueous saline surfactant formulation is prepared from a concentrate comprising the surfactant mixture of the present invention and at least water and/or a cosolvent, preferably 50% by weight to 90% by weight of the surfactant mixture, 5% by weight to 30% by weight of water and 5% by weight to 20% by weight of a cosolvent, based on the total amount of the concentrate.

In this context, it is preferred that:
  a) the cosolvent is selected from the group of the aliphatic alcohols having 3 to 8 carbon atoms or from the group of the alkyl monoethylene glycols, the alkyl diethylene glycols or the alkyl triethylene glycols, where the alkyl radical is an aliphatic hydrocarbyl radical having 3 to 6 carbon atoms; and/or b) the concentrate has a viscosity of <15000 mPas, preferably <10000 mPas, more preferably <5000 mPas, most preferably <3000 mPas at 50° C. and at 10 $s^{-1}$. and/or c) the amount of cosolvent by weight is equal or lower compared to amount of water by weight in the concentrate.

Accordingly, the following preferences are given: a), b), c), a) and b), a) and c), b) and c) as well as a), b) and c).

Advantage of such a concentration is that anionic surfactant (A) of the general formula (I) and anionic surfactant (B) of the general formula (II) are already mixed in the right stoichiometry and that the operator in the oil field only has to dissolve the concentrate in the injection water. Only one storage tank for the concentrate is needed. Separate delivery of two surfactants each as concentrate has the disadvantage that two storage tanks are needed and that skilled workforce is required to survey the mixing in the right ratio. The delivered concentrate comprising the desired mixture of anionic surfactant (A) of the general formula (I) and anionic surfactant (B) of the general formula (II) can be dosed out of the storage tank into the injection water at ambient temperature (e.g. 20° C.) or at elevated temperature (e.g. 60° C.). For example, in case of an alkali-surfactant-polymer flooding, the injection water can already comprise the base, but it can be added after the dissolving step of the surfactant. Afterwards, the base-surfactant mixture dissolved in injection water is mixed with polymer (pre-dissolved e.g. in injection water or in make-up water). Finally, the base-surfactant-polymer mixture in injection water can be pumped through an injection well into the mineral oil deposit.

The anionic surfactant (A) of the general formula (I) and the anionic surfactant (B) of the general formula (II) can be formed as follows. First of all, it requires the preparation of a corresponding alcohol which can be prepared as follows by way of example:

primary linear aliphatic alcohols are prepared by hydrogenating fatty acids (prepared from natural vegetable or animal fats and oils) or by hydrogenating fatty acid methyl esters.

Alternatively, primary linear aliphatic alcohols can be prepared by the Ziegler process by oligomerizing ethylene over an aluminum catalyst and then releasing the alcohol by adding water.

Subsequently, the primary alcohols $R^1OH$ or $R^2OH$ are alkoxylated to give the corresponding prestages of anionic surfactant (A) of the general formula (I) and the anionic surfactant (B) of the general formula (II). The performance of such alkoxylations is known in principle to those skilled in the art. It is likewise known to those skilled in the art that the reaction conditions, especially the selection of the catalyst, can influence the molecular weight distribution of the alkoxylates.

The surfactants according to the general formulae can preferably be prepared by base-catalyzed alkoxylation. In this case, the alcohol $R^1OH$ or $R^2OH$ can be admixed in a pressure reactor with alkali metal hydroxides (e.g. NaOH, KOH, CsOH), preferably potassium hydroxide, or with alkali metal alkoxides, for example sodium methoxide or potassium methoxide. Water (or MeOH) still present in the mixture can be drawn off by means of reduced pressure (for example <100 mbar) and/or increasing the temperature (30 to 150° C.). Thereafter, the alcohol is present in the form of the corresponding alkoxide. This is followed by inertization with inert gas (for example nitrogen) and stepwise addition of the alkylene oxide(s) at temperatures of 60 to 180° C. up to a pressure of not more than 20 bar (preferably not more than 10 bar). In a preferred embodiment, the alkylene oxide is metered in initially at 120° C. In the course of the reaction, the heat of reaction released causes the temperature to rise up to 175° C. However, the reaction temperature can be kept between 120° C. and 175° C. by means of cooling. In a further preferred embodiment of the invention, in case of using $R^1OH$ the propylene oxide is added at a temperature in the range from 120 to 170° C., and subsequently the ethylene oxide is added at a temperature in the range from 120 to 170° C. In a further preferred embodiment of the invention, in case of using $R^2OH$ the ethylene oxide is added at a temperature in the range from 120 to 170° C. At the end of the reaction, the catalyst can, for example, be neutralized by adding acid (for example acetic acid or phosphoric acid) and be filtered off if required. However, the material may also remain unneutralized.

An alternative is the use of amines as catalyst for base-catalyzed alkoxylation of $R^1OH$ or $R^2OH$. For example, imidazole or N,N-dimethylethanolamine can be used as catalyst. The alkoxylation of the alcohols $R^1OH$ or $R^2OH$ can also be undertaken by means of other methods, for example by acid-catalyzed alkoxylation. In addition, it is possible to use, for example, double hydroxide clays, as described in DE 4325237 A1, or it is possible to use double metal cyanide catalysts (DMC catalysts). Suitable DMC catalysts are disclosed, for example, in DE 10243361 A1, especially in paragraphs [0029] to [0041] and the literature cited therein. For example, it is possible to use catalysts of the Zn-Co type. To perform the reaction, the alcohol $R^1OH$ or $R^2OH$ can be admixed with the catalyst, and the mixture dewatered as described above and reacted with the alkylene oxides as described. Typically, not more than 1000 ppm of catalyst based on the mixture are used, and the catalyst can remain in the product owing to this small amount. The amount of catalyst may generally be less than 1000 ppm, for example 250 ppm or less.

Finally, the anionic group—the sulfate group—is introduced. This is known in principle to those skilled in the art. It is possible, for example, to employ the reaction with sulfuric acid, sulfamic acid or chlorosulfonic acid. Alternatively, use of sulfur trioxide in a falling-film reactor with subsequent neutralization is possible. Latter route is the preferred as it is the most economical process. Gaseous sulfur trioxide mixed with e.g. nitrogen (1 to 9 volume percent of sulfur trioxide in the mixture) is reacted with the alkyl alkoxylate ($R^1$—O—$(CH_2C(CH_3)HO)_x$—$(CH_2CH_2O)_y$—H or $R^2$—O—$(CH_2CH_2O)_z$—H) in a falling film reactor (preferably in a falling film reactor from company Ballestra). The liquid alkyl alkoxylate runs as thin film down the wall of the falling film reactor. The gaseous sulfur trioxide mixed with gas (e.g. nitrogen) flows through the tube too and reacts with the alkyl alkoxylate. Reaction temperature is kept between 15 and 90° C. (preferably between 20 and 80° C.) into reaction. The obtained semi sulfuric acid ester is neutralized using sodium hydroxide, potassium hydroxide, ammonia in water or triethanolamine in water. In addition, a cosolvent can be added during the neutralization step in order to break gel phases (purpose to lower viscosity) and to avoid an incomplete neutralization.

The invention relates to manufacturing processes of the surfactant mixture, comprising anionic surfactant (A) of the general formula (I) and anionic surfactant (B) of the general formula (II).

According to the present invention, the anionic surfactant (A) and anionic surfactant (B) are made separately by alkoxylation of alcohols $R^1OH$ and $R^2OH$ in a vessel followed by sulphation with sulfur trioxide in a falling film reactor (including neutralization step afterwards) and mixed finally.

The present invention also relates to a concentrate comprising the surfactant mixture described herein and furtehr comrising water and/or a cosolvent.

Accordingly the concentrate comprises the surfactant mixture with a ratio of anionic surfactant (A) to anionic surfactant (B) of 55:45 to 95:5 by weight, preferably 65:35 to 95:5 by weight, most preferably of 75:25 to 95:5 by weight.

Accordingly, the concentrate comprising the surfactant mixture preferably comprises 50% by weight to 90% by weight of the surfactant mixture, 5% by weight to 30% by weight of water and 5% by weight to 20% by weight of a cosolvent, based on the total amount of the concentrate, where preferably a) the cosolvent is selected from the group of the aliphatic alcohols having 3 to 8 carbon atoms or from the group of the alkyl monoethylene glycols, the alkyl diethylene glycols or the alkyl triethylene glycols, where the alkyl radical is an aliphatic hydrocarbyl radical having 3 to 6 carbon atoms;

and/or b) the concentrate has a viscosity of <15000 mPas, preferably <10000 mPas, more preferably <5000 mPas, most preferably <3000 mPas at 50° C. and at 10 $s^{-1}$.

and/or c) amount of cosolvent by weight is equal or lower compared to amount of water by weight in the concentrate.

Accordingly, the following preferences are given: a), b), c), a) and b), a) and c), b) and c) as well as a), b) and c).

The concentrate preferably comprises at least one organic cosolvent. These are preferably completely water-miscible solvents, but it is also possible to use solvents having only partial water miscibility. In general, the solubility should be at least 50 g/l, preferably at least 100 g/l. Examples include aliphatic $C_4$ to $C_8$ alcohols, preferably $C_4$ to $C_6$ alcohols, which may be substituted by 1 to 5, preferably 1 to 3, ethyleneoxy units to achieve sufficient water solubility. Further examples include aliphatic diols having 2 to 8 carbon atoms, which may optionally also have further substitution. For example, the cosolvent may be at least one selected from the group of 2-butanol, 2 methyl-1-propanol, butylglycol, butyldiglycol and butyltriglycol.

The surfactant mixture as described herein and the concentrate of the present invention can be used in the production of mineral oil from underground mineral oil deposit.

According to a further aspect of the present invention in the method of mineral oil production according to the present invention a polymer or a foam for mobility control can be added. The polymer can optionally be injected into the deposit together with the surfactant formulation, followed by the surfactant formulation. It can also be injected only with the surfactant formulation or only after surfactant formulation. The polymers may be copolymers based on acrylamide or a biopolymer. The copolymer may consist, for example, of the following units inter alia:

acrylamide and acrylic acid sodium salt acrylamide and acrylic acid sodium salt and N-vinylpyrrolidone acrylamide and acrylic acid sodium salt and AMPS (2-acrylamido-2-methylpropanesulfonic acid sodium salt)

acrylamide and acrylic acid sodium salt and AMPS (2-acrylamido-2-methylpropanesulfonic acid sodium salt) and N-vinylpyrrolidone.

The copolymer may also additionally comprise associative groups. Usable copolymers are described in EP 2432807 or in WO 2014095621. Further usable copolymers are described in U.S. Pat. No. 7,700,702.

The polymers can be stabilized by addition of further additives such as biocides, stabilizers, free radical scavengers and inhibitors.

The foam can be produced at the deposit surface or in situ in the deposit by injection of gases such as nitrogen or gaseous hydrocarbons such as methane, ethane or propane. The foam can be produced and stabilized by adding the surfactant mixture claimed or else further surfactants.

Optionally, it is also possible to add a base such as alkali metal hydroxide or alkali metal carbonate to the surfactant formulation, in which case the addition is optionally combined with the addition of complexing agents or polyacrylates in order to prevent precipitation as a result of the presence of polyvalent cations. In addition, it is also possible to add a cosolvent to the formulation.

This gives rise to the following (combined) methods:
surfactant flooding
Winsor type III microemulsion flooding
surfactant/polymer flooding
Winsor type III microemulsion/polymer flooding
alkali/surfactant/polymer flooding
alkali/Winsor type III microemulsion/polymer flooding
surfactant/foam flooding
Winsor type III microemulsion/foam flooding
alkali/surfactant/foam flooding
alkali/Winsor type III microemulsion/foam flooding In a preferred embodiment of the invention, one of the first four methods is employed (surfactant flooding, Winsor type III microemulsion flooding, surfactant/polymer flooding or Winsor type III microemulsion/polymer flooding). Particular preference is given to Winsor type III microemulsion/polymer flooding.

In Winsor type III microemulsion/polymer flooding, in the first step, a surfactant formulation is injected with or without polymer. The surfactant formulation, on contact with crude oil, results in the formation of a Winsor type III microemulsion. In the second step, only polymer is injected. In the first step in each case, it is possible to use aqueous formulations having higher salinity than in the second step. Alternatively, both steps can also be conducted with water of equal salinity.

In one embodiment, the methods can of course also be combined with water flooding. In the case of water flooding, water is injected into a mineral oil deposit through at least one injection well, and crude oil is withdrawn from the deposit through at least one production well. The water may be freshwater or saline water such as seawater or deposit water. After the water flooding, the method of the invention may be employed.

To execute the method of the invention, at least one production well and at least one injection well are sunk into the mineral oil deposit. In general, a deposit is provided with several injection wells and with several production wells. The wells can be vertical and/or horizontal. An aqueous formulation of the water-soluble components described is injected through the at least one injection well into the mineral oil deposit, and crude oil is withdrawn from the deposit through at least one production well. As a result of the pressure generated by the aqueous formulation injected, called the "flood", the mineral oil flows in the direction of the production well and is produced via the production well. The term "mineral oil" in this context of course does not just mean single-phase oil; instead, the term also encompasses the usual crude oil-water emulsions. It will be clear to the person skilled in the art that a mineral oil deposit may also have a certain temperature distribution. Said deposit temperature is based on the region of the deposit between the injection and production wells which is covered by the flooding with aqueous solutions. Methods of determining the temperature distribution of a mineral oil deposit are known in principle to those skilled in the art. The temperature distribution is generally determined from temperature measurements at particular sites in the formation in combination with simulation calculations; the simulation calculations also take account of the amounts of heat introduced into the formation and the amounts of heat removed from the formation.

The method of the invention can especially be employed in mineral oil deposits having an average porosity of 5 mD to 4 D, preferably 50 mD to 2 D and more preferably 200 mD to 1 D. The permeability of a mineral oil formation is reported by the person skilled in the art in the unit "darcy" (abbreviated to "D" or "mD" for "millidarcies"), and can be determined from the flow rate of a liquid phase in the mineral oil formation as a function of the pressure differential applied. The flow rate can be determined in core flooding tests with drill cores taken from the formation. Details of this can be found, for example, in K. Weggen, G. Pusch, H. Rischmüller in *"Oil and Gas"*, pages 37 ff., *Ullmann's Encyclopedia of Industrial Chemistry, Online Edition,* Wiley-VCH, Weinheim 2010. It will be clear to the person skilled in the art that the permeability in a mineral oil deposit need not be homogeneous, but generally has a certain distribution, and the permeability reported for a mineral oil deposit is accordingly an average permeability.

To execute the method for oil production, an aqueous formulation is used, comprising, as well as water, at least the described surfactant mixture of anionic surfactant (A) of the general formula (I) and the anionic surfactant (B) of the general formula (II).

Optionally, the formulation may additionally comprise further surfactants. These are, for example, anionic surfactants of the alkylarylsulfonate or olefinsulfonate (alpha-olefinsulfonate or internal olefinsulfonate) type and/or nonionic surfactants of the alkyl ethoxylate or alkyl polyglucoside type. These further surfactants may especially also be oligomeric or polymeric surfactants. It is advantageous to use such polymeric co-surfactants to reduce the amounts of surfactants needed to form a microemulsion. Such polymeric co surfactants are therefore also referred to as "microemulsion boosters". Examples of such polymeric surfactants comprise amphiphilic block copolymers which comprise at least one hydrophilic block and at least one hydrophobic block. Examples comprise polypropylene oxide-polyethylene oxide block copolymers, polyisobutene-polyethylene oxide block copolymers, and comb polymers with polyethylene oxide side chains and a hydrophobic main chain, where the main chain preferably comprises essentially olefins or (meth)acrylates as monomers. The term "polyethylene oxide" here should in each case include polyethylene oxide blocks comprising propylene oxide units as defined above. Further details of such surfactants are disclosed in WO 2006/131541 A1.

The formulation is made up in water comprising salts. Of course, there may also be mixtures of different salts. For example, it is possible to use seawater to make up the aqueous formulation, or it is possible to use produced formation water, which is reused in this way. In the case of offshore production platforms, the formulation is generally made up in seawater. In the case of onshore production facilities, the polymer can advantageously first be dissolved in fresh water and the solution obtained can be diluted to the desired use concentration with formation water. Alternatively, the salt content of the injection water can be reduced by means of desalination techniques (e.g. use of membranes for ultrafiltration, nanofiltration, reverse osmosis, and forward osmosis or e.g. precipitation of bivalent cations with bivalent anions).

The salts may especially be alkali metal salts and alkaline earth metal salts. Examples of typical anions include $Na^+$, $K^+$, $Mg^{2+}$ and/or $Ca^{2+}$, and examples of typical cations include chloride, bromide, hydrogencarbonate, sulfate or borate. In case, that injection water is softened, then no alkaline earth metal ions are present.

In general, at least one or more than one alkali metal ion is present, especially at least $Na^+$. In addition, alkaline earth metal ions are also maybe present, in which case the weight ratio of alkali metal ions / alkaline earth metal ions is generally ≥2, preferably 3. In case, that injection water is softened, then no alkaline earth metal ions are present. Anions present are generally at least one or more than one halide ion(s), especially at least $Cl^-$. In general, the amount of $Cl^-$ is at least 50% by weight, preferably at least 65% by weight, based on the sum total of all the anions.

The total amount of all the salts in the aqueous formulation may be up to 350 000 ppm (parts by weight), based on the sum total of all the components in the formulation, for example 500 ppm to 350 000 ppm, especially 2000 ppm to 250 000 ppm. If seawater is used to make up the formulation, the salt content may be 2000 ppm to 40 000 ppm, and, if formation water is used, the salt content may be 2000 ppm to 250 000 ppm, for example 3000 ppm to 100 000 ppm. The amount of alkaline earth metal ions may preferably be 0 to 53 000 ppm, more preferably 0 ppm to 20 000 ppm and even more preferably 0 to 6000 ppm.

Additives can be used, for example, in order to prevent unwanted side effects, for example the unwanted precipitation of salts, or in order to stabilize the polymer used. The polymer-containing formulations injected into the formation in the flooding process flow only very gradually in the direction of the production well, meaning that they remain under formation conditions in the formation for a prolonged period. Degradation of the polymer results in a decrease in the viscosity. This either has to be taken into account through the use of a higher amount of polymer, or else it has to be accepted that the efficiency of the method will worsen. In each case, the economic viability of the method worsens. A multitude of mechanisms may be responsible for the degradation of the polymer. By means of suitable additives, the polymer degradation can be prevented or at least delayed according to the conditions.

In one embodiment of the invention, the aqueous formulation used comprises at least one oxygen scavenger. Oxygen scavengers react with oxygen which may possibly be present in the aqueous formulation and thus prevent the oxygen from being able to attack the polymer or polyether groups. Examples of oxygen scavengers comprise sulfites, for example $Na_2SO_3$, bisulfites, phosphites, hypophosphites or dithionites.

In a further embodiment of the invention, the aqueous formulation used comprises at least one free radical scavenger. Free radical scavengers can be used to counteract the degradation of the polymer by free radicals. Compounds of this kind can form stable compounds with free radicals. Free radical scavengers are known in principle to those skilled in the art. For example, they may be stabilizers selected from the group of sulfur compounds, secondary amines, sterically hindered amines, N-oxides, nitroso compounds, aromatic hydroxyl compounds or ketones. Examples of sulfur compounds include thiourea, substituted thioureas such as N,N'-dimethylthiourea, N,N'-diethylthiourea, N,N'-diphenylthiourea, thiocyanates, for example ammonium thiocyanate or potassium thiocyanate, tetramethylthiuram disulfide, and mercaptans such as 2-mercaptobenzothiazole or 2-mercaptobenzimidazole or salts thereof, for example the sodium salts, sodium dimethyldithiocarbamate, 2,2'-dithiobis(benzothiazole), 4,4'-thiobis(6-t-butyl-m-cresol). Further examples include phenoxazine, salts of carboxylated phenoxazine, carboxylated phenoxazine, methylene blue, dicyandiamide, guanidine, cyanamide, paramethoxyphenol, sodium salt of paramethoxyphenol, 2-methylhydroquinone, salts of 2-methylhydroquinone, 2,6-di-t-butyl-4-methylphenol, butylhydroxyanisole, 8-hydroxyquinoline, 2,5-di(t-amyl)-hydroquinone, 5-hydroxy-1,4-naphthoquinone, 2,5-di(t-amyl)hydroquinone, dimedone, propyl 3,4,5-trihydroxybenzoate, ammonium N-nitrosophenylhydroxylamine, 4-hydroxy-2,2,6,6-tetramethyloxypiperidine, N-(1,3-dimethylbutyl)-N'-phenyl-p-phenylenediamine and 1,2,2,6,6-pentamethyl-4-piperidinol. Preference is given to sterically hindered amines such as 1,2,2,6,6-pentamethyl-4-piperidinol and sulfur compounds, mercapto compounds, especially 2-mercaptobenzothiazole or 2-mercaptobenzimidazole or salts thereof, for example the sodium salts, and particular preference is given to 2-mercaptobenzothiazole or salts thereof.

In a further embodiment of the invention, the aqueous formulation used comprises at least one sacrificial reagent. Sacrificial reagents can react with free radicals and thus render them harmless. Examples include especially alcohols. Alcohols can be oxidized by free radicals, for example to ketones. Examples include monoalcohols and polyalcohols, for example 1-propanol, 2-propanol, propylene glycol, glycerol, butanediol or pentaerythritol.

In a further embodiment of the invention, the aqueous formulation used comprises at least one complexing agent. It is of course possible to use mixtures of various complexing agents. Complexing agents are generally anionic compounds which can complex especially divalent and higher-valency metal ions, for example $Mg^+$ or $Ca^{2+}$. In this way, it is possible, for example, to prevent any unwanted precipitation. In addition, it is possible to prevent any polyvalent metal ions present from crosslinking the polymer by means of acidic groups present, especially COOH group. The complexing agents may especially be carboxylic acid or phosphonic acid derivatives. Examples of complexing agents include ethylenediaminetetraacetic acid (EDTA), ethylenediaminesuccinic acid (EDDS), diethylenetriaminepentamethylenephosphonic acid (DTPMP), methylglycinediacetic acid (MGDA) and nitrilotriacetic acid (NTA). Of course, the corresponding salts of each may also be involved, for example the corresponding sodium salts. In a particularly preferred embodiment of the invention, MGDA is used as complexing agent As an alternative to or in addition to the abovementioned chelating agents, it is also possible to use polyacrylates.

In a further embodiment of the invention, the formulation comprises at least one organic cosolvent. These are preferably completely water-miscible solvents, but it is also possible to use solvents having only partial water miscibility. In general, the solubility should be at least 50 g/l, preferably at least 100 g/l. Examples include aliphatic $C_4$ to $C_{b\,8}$ alcohols, preferably $C_4$ to $C_6$ alcohols, which may be substituted by 1 to 5, preferably 1 to 3, ethyleneoxy units to achieve sufficient water solubility. Further examples include aliphatic diols having 2 to 8 carbon atoms, which may optionally also have further substitution. For example, the cosolvent may be at least one selected from the group of 2-butanol, 2 methyl-1-propanol, butylglycol, butyldiglycol and butyltriglycol.

The concentration of the polymer in the aqueous formulation is fixed such that the aqueous formulation has the desired viscosity for the end use. The viscosity of the formulation should generally be at least 5 mPas (measured at 25° C. and a shear rate of 7 $s^{-1}$), preferably at least 10 mPas.

According to the invention, the concentration of the polymer in the formulation is 0.02% to 2% by weight, based on the sum total of all the components of the aqueous formulation. The amount is preferably 0.05% to 0.5% by weight, more preferably 0.1% to 0.3% by weight and, for example, 0.1% to 0.2% by weight.

The aqueous polymer-comprising formulation can be prepared by initially charging the water, sprinkling the polymer in as a powder and mixing it with the water. Apparatus for dissolving polymers and injecting the aqueous solutions into underground formations is known in principle to those skilled in the art.

The injecting of the aqueous formulation can be undertaken by means of customary apparatuses. The formulation can be injected into one or more injection wells by means of customary pumps. The injection wells are typically lined with steel tubes cemented in place, and the steel tubes are perforated at the desired point. The formulation enters the mineral oil formation from the injection well through the perforation. The pressure applied by means of the pumps, in a manner known in principle, is used to fix the flow rate of the formulation and hence also the shear stress with which the aqueous formulation enters the formation. The shear stress on entry into the formation can be calculated by the person skilled in the art in a manner known in principle on the basis of the Hagen-Poiseuille law, using the area through which the flow passes on entry into the formation, the mean pore radius and the volume flow rate. The average permeability of the formation can be found as described in a manner known in principle. Naturally, the greater the volume flow rate of aqueous polymer formulation injected into the formation, the greater the shear stress.

The rate of injection can be fixed by the person skilled in the art according to the conditions in the formation. Preferably, the shear rate on entry of the aqueous polymer formulation into the formation is at least 30 000 $s^{-1}$, preferably at least 60 000 $s^{-1}$ and more preferably at least 90 000 $s^{-1}$.

In one embodiment of the invention, the method of the invention is a flooding method in which a base and typically a complexing agent or a polyacrylate is used. This is typically the case when the proportion of polyvalent cations in the deposit water is low (100-400 ppm). An exception is sodium metaborate, which can be used as a base in the presence of significant amounts of polyvalent cations even without complexing agent.

The pH of the aqueous formulation is generally at least 8, preferably at least 9, especially 9 to 13, preferably 10 to 12 and, for example, 10.5 to 11.

In principle, it is possible to use any kind of base with which the desired pH can be attained, and the person skilled in the art will make a suitable selection. Examples of suitable bases include alkali metal hydroxides, for example NaOH or KOH, or alkali metal carbonates, for example $Na_2CO_3$. In addition, the bases may be basic salts, for example alkali metal salts of carboxylic acids, phosphoric acid, or especially complexing agents comprising acidic groups in the base form, such as $EDTANa_4$.

Mineral oil typically also comprises various carboxylic acids, for example naphthenic acids, which are converted to the corresponding salts by the basic formulation. The salts act as naturally occurring surfactants and thus support the process of oil removal.

With complexing agents, it is advantageously possible to prevent unwanted precipitation of sparingly soluble salts, especially Ca and Mg salts, when the alkaline aqueous formulation comes into contact with the corresponding metal ions and/or aqueous formulations for the process comprising corresponding salts are used. The amounts of complexing agents are selected by the person skilled in the art. It may, for example, be 0.1% to 4% by weight, based on the sum total of all the components of the aqueous formulation.

In a particularly preferred embodiment of the invention, however, a method of mineral oil production is employed in which a base (e.g. alkali metal hydroxides or alkali metal carbonates) is used.

The following examples are intended to illustrate the invention and its advantages in detail:

Preparation of the Mixture Comprising Anionic Surfactant (A) and Anionic Surfactant (B):

Abbreviations used:
EO ethyleneoxy
PO propyleneoxy
BuO 1,2-butyleneoxy
For the synthesis, the following alcohols were used:

| Alcohol | Description |
| --- | --- |
| $C_{16}C_{18}$ | Commercially available tallow fatty alcohol mixture consisting of linear saturated primary $C_{16}H_{33}$—OH and $C_{18}H_{37}$—OH |
| $C_{12}C_{14}$ | Commercially available fatty alcohol mixture consisting of linear saturated primary $C_{12}H_{25}$—OH and $C_{14}H_{29}$—OH |

1 a) C16C18-7 PO-H

Corresponds to prestage (intermediate) of surfactant (A) of the general formula (I) $R^1$—O—$(CH_2C(CH_3)HO)_x$—$(CH_2CH_2O)_y$—H with $R^1=C_{16}H_{33}/C_{18}H_{37}$, x=7 and y=0

A 2 L pressure autoclave with anchor stirrer was initially charged with 384 g (1.5 mol, 1.0 eq) of C16C18 alcohol and the stirrer was switched on. Thereafter, 5.2 g of 50% aqueous KOH solution (0.046 mol of KOH, 2.6 g of KOH) were added, a reduced pressure of 25 mbar was applied, and the mixture was heated to 100° C. and kept there for 120 min, in order to distill off the water. The mixture was purged three times with $N_2$. Thereafter, the vessel was tested for pressure retention, 1.0 bar gauge (2.0 bar absolute) was set, the mixture was heated to 130° C. and then the pressure was set to 2.0 bar absolute. At 150 revolutions per minute, 609 g (10.5 mol, 7.0 eq) of propylene oxide were metered in at 130° C. within 7 h; pmax was 4.0 bar absolute. The mixture was stirred at 130° C. for a further 2 h. The pressure was constant, cooled down to 100° C. and decompressed to 1.0 bar absolute. A vacuum of <10 mbar was applied and residual oxide was drawn off for 2 h. The vacuum was broken with $N_2$ and the product was decanted at 80° C. under $N_2$. In a rotary evaporator, the mixture was stirred at 100° C. and <10 mbar for 3 h. Then it was filled into a flask with stirrer and 2.76 g (0.046 mol) of acetic acid was added. Analysis (mass spectrum, GPC, 1H NMR in CDCl3, 1H NMR in MeOD) confirmed the mean composition C16C18-7 PO-H.

2 a) C12C14-2 EO-H

Corresponds to prestage of surfactant (B) of the general formula (II) $R^2$—O—$(CH_2CH_2O)_z$—H with $R^1=C_{12}H_{25}/C_{14}H_{29}$, and z=2

A 2 L pressure autoclave with anchor stirrer was initially charged with 290 g (3.0 mol, 1.0 eq) of C12C14 alcohol and the stirrer was switched on. Thereafter, 10.4 g of 50% aqueous KOH solution (0.092 mol of KOH, 5.2 g of KOH) were added, a reduced pressure of 35 mbar was applied, and the mixture was heated to 100° C. and kept there for 120 min, in order to distill off the water. The mixture was purged three times with $N_2$. Thereafter, the vessel was tested for pressure retention, 1.0 bar gauge (2.0 bar absolute) was set, the mixture was heated to 130° C. and then the pressure was set to 2.0 bar absolute. At 150 revolutions per minute, 264 g (6 mol, 2.0 eq) of ethylene oxide were metered in at 130° C. within 3 h; pmax was 4.0 bar absolute. The mixture was stirred at 130° C. for a further 2 h. The pressure was constant, cooled down to 100° C. and decompressed to 1.0 bar absolute. A vacuum of 35 mbar was applied and residual oxide was drawn off for 2 h. The vacuum was broken with $N_2$ and the product was decanted at 80° C. under $N_2$. In a rotary evaporator, the mixture was stirred at 100° C. and 35 mbar for 3 h. Then it was filled into a flask with stirrer and 5.52 g (0.092 mol) of acetic acid was added. Analysis (mass spectrum, GPC, 1H NMR in CDCl3, 1H NMR in MeOD) confirmed the mean composition C12C14 -2 EO-H.

1 b) C16C18 -7 PO-$SO_4Na$

Corresponds to surfactant (A) of the general formula (II) $R^1$—O—$(CH_2C(CH_3)HO)_x$—$(CH_2CH_2O)_y$—$SO_3M$ with $R^1=C_{16}H_{33}/C_{18}H_{37}$, x=7, y=0, and M=Na In an one liter round-bottom flask with anchor stirrer, C16C18-7 PO-H (166.9 g, 0.25 mol, 1.0 eq) was dissolved under stirring in dichloromethane (330 g) and cooled to 5 to 10° C. Thereafter, chloro sulfonic acid (37.7 g, 0.325 mol, 1.3 eq) was added dropwise such that the temperature did not exceed 10° C. The mixture was allowed to warm up to 21° C. and was stirred under a nitrogen stream at this temperature for 4 h before the above reaction mixture was added dropwise into a two liter round-bottom-flask with anchor stirrer, which comprised a stirred solution of NaOH (0.3375 mol NaOH, 13.5 g NaOH, 1.35 eq) in water (400 g) at max. 15° C. The resulting pH to 8 to 9 was adjusted by addition HCl in water. The dichloromethane was removed at 50° C. and at 30 mbar using a rotary evaporator. The water content was determined (Karl-Fischer method), butyl diethylene glycol (48 g) was added and then the water was further at 50° C. and at 30 mbar using a rotary evaporator until a water content of 28 wt % was achieved. The solution comprised 57 wt % surfactants, 14 wt % cosolvent, 28 wt % water and less than 1 wt % salt. The product was characterized by $^1$H NMR and confirmed the desired structure. Sulfation degree was significantly above 90 mol %.

2 b) C12C14-2 EO-SO$_4$Na

Corresponds to surfactant (B) of the general formula (II) $R^2$—O—(CH$_2$CH$_2$O)$_z$—SO$_3$M with $R^1$=C$_{12}$H$_{25}$/C$_{14}$H$_{29}$, z=2, and M=Na.

In an one liter round-bottom flask with anchor stirrer, C12C14 -2 EO-H (140.5 g, 0.50 mol, 1.0 eq) was dissolved under stirring in dichloromethane (280 g) and cooled to 5 to 10° C. Thereafter, chloro sulfonic acid (75.4 g, 0.65 mol, 1.3 eq) was added dropwise such that the temperature did not exceed 10° C. The mixture was allowed to warm up to 21° C. and was stirred under a nitrogen stream at this temperature for 4 h before the above reaction mixture was added dropwise into a two liter round-bottom-flask with anchor stirrer, which comprised a stirred solution of NaOH (0.675 mol NaOH, 27 g NaOH, 1.35 eq) in water (300 g) at max. 15° C. The resulting pH to 8 to 9 was adjusted by addition HCl in water. The dichloromethane was removed at 50° C. and at 30 mbar using a rotary evaporator. The water content was determined (Karl-Fischer method) and then the water was further at 50° C. and at 30 mbar using a rotary evaporator until a water content of 30 wt % was achieved. The solution comprised 69 wt % surfactants, 30 wt % water and less than 1 wt % salt. The product was characterized by $^1$H NMR and confirmed the desired structure. Sulfation degree was significantly above 90 mol %.

3a) Concentrate of ca. 9:1 mixture of C16C18 -7 PO-SO$_4$Na to C12C14-2 EO-SO4Na Corresponds to mixture of surfactant (A) of the general formula (I) $R^1$—O—(CH$_2$C(CH$_3$)HO)$_x$—(CH$_2$CH$_2$)$_y$—SO$_3$M with $R^1$=C$_{16}$H$_{33}$/C$_{18}$H$_{37}$, x=7, y=0, and M=Na with surfactant (B) of the general formula (II) $R^2$—O—(CH$_2$CH$_2$O)$_z$—H with $R^1$=C$_{12}$H$_{25}$/C$_{14}$H$_{29}$, z=2, and M=Na in the ratio of 89:11 by weight.

In a 100 ml round bottom flask with stirrer bar, 15 g of surfactant solution of C16C18-7 PO-SO4Na from example 2 a), comprising 57 wt % surfactants, 14 wt % butyl diethylene glycole, 28 wt % water and less than 1 wt % salt, were added and heated to 50° C. under stirring. Then, 1.38 g of surfactant solution of C12C14-2 EO-SO4Na from example 2 b), comprising 69 wt % surfactants, 30 wt % water and less than 1 wt % salt, were added. Mixture was stirred for 1 h at 50° C. and then cooled to 20° C. The obtained concentrate comprised a ca. 9:1 ratio (by weight) of C16C18-7 PO-SO4Na to C12C14-2EO-SO4Na. Total surfactant content in the concentrate was ca. 58% by weight, content of cosolvent butyl diethylene glycole was ca. 13% by weight, content of water was ca. 28% by weight, and salt content was less than 1% by weight.

3 b) Concentrate of ca. 6:4 mixture of C16C18-7 PO-SO$_4$Na to C12C14-2 EO-SO4Na Corresponds to mixture of surfactant (A) of the general formula (I) $R^1$—O—(CH$_2$C(CH$_3$)HO)$_x$—(CH$_2$CH$_2$O)$_y$—SO$_3$M with $R^1$=C$_{16}$H$_{33}$/C$_{18}$H$_{37}$, x=7, y=0, and M=Na with surfactant (B) of the general formula (II) $R^2$—O—(CH$_2$CH$_2$O)$_z$—H with $R^1$=C$_{12}$H$_{25}$/C$_{14}$H$_{29}$, z=2, and M=Na in the ratio of 60:40 by weight.

In a 100 ml round bottom flask with stirrer bar, 9 g of surfactant solution of C16C18-7PO-SO4Na from example 2 a), comprising 57 wt % surfactants, 14 wt % butyl diethylene glycole, 28 wt % water and less than 1 wt % salt, were added and heated to 50° C. under stirring. Then, 5 g of surfactant solution of C12C14 -2 EO-SO4Na from example 2 b), comprising 69 wt % surfactants, 30 wt % water and less than 1 wt % salt, were added. Mixture was stirred for 1 h at 50° C. and then cooled to 20° C. The obtained concentrate comprised a ca. 6:4 ratio (by weight) of C16C18-7 PO-SO4Na to C12C14-2 EO-SO4Na. Total surfactant content in the concentrate was ca. 61% by weight, content of cosolvent butyl diethylene glycole was ca. 9% by weight, content of water was ca. 29% by weight, and salt content was less than 1% by weight.

Further surfactants and concentrates are prepared in an analogous way. For example, an aqueous cosolvent-free concentrate of C16C18-7 PO-SO$_4$Na was made according to procedure above but without addition of cosolvent butyl diethylene glycole. In order to cope with gel formation at 20° C. during synthesis, a lower concentration (30 wt % and lower) of alkyl ether sulfates can be targeted. If higher concentrations are needed, then water can be removed under reduced pressure at 50° C. in a rotary evaporator.

Testing of the mixture comprising anionic surfactant (A) and anionic surfactant (B):

Test methods:

Determination of stability

The stability of the concentrates of the anionic surfactant (A)/anionic surfactant (B) mixture was determined by visual assessment after storage at appropriate temperatures for 12 weeks at 20° C. The concentrates comprised water and butyl diethylene glycol, and also the anionic surfactant (A)/anionic surfactant (B) mixture described in the preparation examples. Notice was taken as to whether the concentrates remain homogeneous or whether significant phase separations which prevent homogeneous sampling arise. In addition, the concentrates (where possible) were heated to 50° C. and cooled again at 20° C., and an observation was made as to whether an irreversible phase separation arises.

Determination of viscosity

The dynamic viscosities of the concentrates of the anionic surfactant (A)/anionic surfactant (B) mixture were determined with an Anton Parr MCR302 viscometer. The concentrates comprised water and butyl diethylene glycol (BDG), and also anionic surfactant (A)/anionic surfactant (B) mixture described in the preparation examples. The viscosities were conducted at shear rates of 10, 20, and (optionally) 100 s$^{-1}$ and temperatures of 20 and 50° C.

Determination of solubility

The surfactants in the concentration to be examined in each case in saline water with the particular salt composition were stirred at 20-30° C. for 30 min. Thereafter, the mixture was heated stepwise until turbidity or a phase separation set in. This was followed by cautious cooling, and the point at which the solution became clear or scattering became slight again was noted. This was recorded as the cloud point.

At particular fixed temperatures, the appearance of the surfactant solution in saline water was noted. Clear solutions or solutions which have slight scatter and become somewhat lighter in color again through gentle shear (but do not foam with time) are regarded as acceptable. Said slightly scattering surfactant solutions were filtered through a filter having pore size 2 μm. No removal at all was found.

Determination of interfacial tension

Interfacial tensions of crude oil with respect to saline water were determined in the presence of the surfactant solution at a temperature by the spinning drop method on an SVT20 from DataPhysics. For this purpose, an oil droplet was injected into a capillary filled with saline surfactant solution at temperature and the expansion of the droplet at approximately 4500 revolutions per minute was observed and the evolution of the interfacial tension with time was noted. The interfacial tension IFT (or s $_{II}$) is calculated—as described by Hans-Dieter Dörfler in "Grenzflächen und kolloid-disperse Systeme" [Interfaces and Colloidally Disperse Systems], Springer Verlag Berlin Heidelberg 2002—by the following formula from the cylinder diameter $d_z$, the speed of rotation w, and the density differential:

$$(d_1-d_2):s_{II}=0.25 \cdot d_z^3 \cdot w2 \cdot (d_1-d_2).$$

The API gravity (American Petroleum Institute gravity) is a conventional unit of density commonly used in the USA for crude oils. It is used globally for characterization and as a quality standard for crude oil. The API gravity is calculated from the relative density $p_{rel}$ of the crude oil at 60° F. (15.56° C.), based on water, using $$\text{API gravity}=(141.5/p_{rel})-131.5.$$

Determination of oil mobilization and surfactant adsorption rate in coreflood test Crude oil (e.g. filtered and viscosity adjustment by addition of cyclohexane) and synthetic saline water (dissolution of salt, filtration, adjustment of pH value, salinity determination, degassing) were prepared before. New sandstone cores were measured at dry state (mass, pore volume, porosity) and then saturated with the saline water. Brine permeability was e.g. determined before and after a tracer test. Then, crude oil was injected at reservoir temperature and aged.

After oil permeability determination and Soi and Swir calculation, the cores were flooded with (saline) water. Chemicals were dissolved in injection water and degassed. Injection of chemicals followed and effluent was analyzed (collection of oil and water phase, determination of surfactant retention by HPLC-analysis).

Test results:

The following test results were achieved:

The test results for stability and viscosity of the concentrates are shown in table 1.

TABLE 1

| | | | | | |
|---|---|---|---|---|---|
| Concentrates of anionic surfactant (A)/anionic surfactant (B) | | | | | |
| Ex. | Surfactant concentrate | Viscosity at 20° C. and different shear rates | Viscosity at 50° C. and different shear rates | Appearance after storage at 20° C. for 12 weeks | Appearance after heating to 50° C. |
| 1 | Concentrate of ca. 9:1 (by weight) mixture of C16C18—7 PO—SO$_4$Na$^a$ to C12C14—2 EO—SO4Na$^b$ [surfactant content in the concentrate was ca. 58% by weight, content of cosolvent butyl diethylene glycole was ca. 13% by weight, content of water was ca. 28% by weight, and salt content was less than 1% by weight]$^c$ | 3030 mPas (10 s$^{-1}$). 1900 mPas (20 s$^{-1}$). <1000 mPas (100 s$^{-1}$). | 1850 mPas (10 s$^{-1}$). 1240 mPas (20 s$^{-1}$). <<1000 mPas (100 s$^{-1}$). | Homogeneous, flowable liquid at 20° C. and at low shear | Homogeneous, flowable liquid at 50° C. and at low shear |
| 2 | Concentrate of ca. 8:2 (by weight) mixture of C16C18—7 PO—SO$_4$Na$^a$ to C12C14—2 EO—SO4Na$^b$ [surfactant content in the concentrate was ca. 78% by weight, content of cosolvent butyl diethylene glycole was ca. 8% by weight, content of water was ca. 13% by weight, and salt content was less than 1% by weight] | 830 mPas (10 s$^{-1}$). 770 mPas (20 s$^{-1}$). 690 mPas (100 s$^{-1}$). | 290 mPas (10 s$^{-1}$). 210 mPas (20 s$^{-1}$). 190 mPas (100 s$^{-1}$). | Homogeneous, flowable liquid at 20° C. and at low shear | Homogeneous, easily flowable liquid at 50° C. and at low shear |
| 3 | Concentrate of ca. 7:3 (by weight) mixture of C16C18—7 PO—SO$_4$Na$^a$ to C12C14—2 EO—SO4Na$^b$ [surfactant content in the concentrate was ca. 77% by weight, content of cosolvent butyl diethylene glycole was ca. 7% by weight, content of water was ca. 15% by weight, and salt content was less than 1% by weight] | 5000 mPas (10 s$^{-1}$). 4000 mPas (20 s$^{-1}$). 2170 mPas (100 s$^{-1}$). | 3750 mPas (10 s$^{-1}$). 2360 mPas (20 s$^{-1}$). 390 mPas (100 s$^{-1}$). | Homogeneous, viscous and flowable liquid at 20° C. | Homogeneous, viscous and flowable liquid at 50° C. |
| 4 | Concentrate of ca. 6:4 (by weight) mixture | 19900 mPas (10 s$^{-1}$). | 4110 mPas (10 s$^{-1}$). | Homogeneous, viscous and | Homogeneous, viscous and |

TABLE 1-continued

Concentrates of anionic surfactant (A)/anionic surfactant (B)

| Ex. | Surfactant concentrate | Viscosity at 20° C. and different shear rates | Viscosity at 50° C. and different shear rates | Appearance after storage at 20° C. for 12 weeks | Appearance after heating to 50° C. |
|---|---|---|---|---|---|
| | of C16C18—7 PO—SO$_4$Na$^a$ to C12C14—2 EO—SO4Na$^b$ [surfactant content in the concentrate was ca. 69% by weight, content of water was ca. 30% by weight, and salt content was less than 1% by weight] | 11900 mPas (20 s$^{-1}$). 3200 mPas (100 s$^{-1}$). | 2560 mPas (20 s$^{-1}$). <1000 mPas (100 s$^{-1}$). | very slow flowable liquid at 20° C. and at low shear | flowable liquid at 50° C. and at low shear |
| C5 | Concentrate of C16C18—7 PO—SO$_4$Na$^a$ in water [surfactant content in the concentrate was ca. 60% by weight, content of water was ca. 39% by weight, and salt content was less than 1% by weight] | 9600 mPas (10 s$^{-1}$). 5810 mPas (20 s$^{-1}$). 2100 mPas (100 s$^{-1}$). | 11960 mPas (10 s$^{-1}$). 8300 mPas (20 s$^{-1}$). 2500 mPas (100 s$^{-1}$). | Homogeneous, viscous and very slow flowable liquid at 20° C. and at low shear | Homogeneous, viscous and very slow flowable liquid at 50° C. and at low shear |
| C6 | Concentrate of C12C14—2 EO—SO$_4$Na$^b$ in water [surfactant content in the concentrate was ca. 69% by weight, content of water was ca. 30% by weight, and salt content was less than 1% by weight] | 6950 mPas (10 s$^{-1}$). 4060 mPas (20 s$^{-1}$). 1310 mPas (100 s$^{-1}$). | 7290 mPas (10 s$^{-1}$). 4670 mPas (20 s$^{-1}$). 1350 mPas (100 s$^{-1}$). | Homogeneous, viscous and very slow flowable liquid at 20° C. and at low shear | Homogeneous, viscous and very slow flowable liquid at 50° C. and at low shear |

$^a$corresponds to anionic surfactant (A) of general formula (I) R$^1$—O—(CH$_2$C(CH$_3$)HO)$_x$—(CH$_2$CH$_2$O)$_y$—SO$_3$M with R$^1$ = C$_{16}$H$_{33}$/C$_{18}$H$_{37}$, x = 7, y = 0, and M = Na.
$^b$corresponds to anionic surfactant (B) of general formula (II) R$^2$—O—(CH$_2$CH$_2$O)$_z$—SO$_3$M with R$^2$ = C$_{12}$H$_{25}$/C$_{14}$H$_{29}$, z = 2, and M = Na.
$^c$as described in example 3a) in 'Preparation of the mixture comprising anionic surfactant (A) and anionic surfactant (B)'

As can be seen in table 1 from examples 1 to 3, the claimed concentrates comprising surfactant mixture of anionic surfactant (A) and anionic surfactant (B) and the cosolvent butyl diethylene glycol and water lead to homogeneous flowable liquids at 20° C. after 12 weeks. Heating-cooling-cycle did not lead to changes. This is a good indication for robust storage of material e.g. in remote locations, where additional work for homogenizations means use of expensive energy. In case of such concentrates and even at different ratios of anionic surfactant (A) to anionic surfactant (B), the obtained viscosities were in acceptable range of <5000 mPas for handling/pumping at 20° C. and low shear of 10 s$^{-1}$. Increase of shear rate to higher values or increase of temperature to 50° C. lead to lower values—e.g. <4000 mPas at 50° C. and 10 s$^{-1}$ or <1000 mPas at 50° C. and 100 s$^{-1}$. This gentle heating for further viscosity reduction is favored as less energy is needed and such temperatures do not change surfactant structure. At temperatures of 95° C. for longer time, the viscosity is much lower, but also the sulfate group might be cleaved due to presence of water. Example 4 shows a claimed surfactant mixture, but without cosolvent butyl diethylene glycole. The viscosities are higher compared to the viscosities in examples 1 to 3. In addition, concentrate in example 4 is still flowable, but less flowable than the concentrates in examples 1 to 3, in particular at 50° C. This shows the benefit of presence of cosolvent such as butyl diethylene glycol. It is surprising to see, that claimed surfactant mixture of anionic surfactant (A) and of anionic surfactant (B) in claimed ratios lead still to a concentrate, which shows at 50° C. lower viscosities at 10, 20 or 100 s$^{-1}$ than the aqueous concentrates of the single surfactants anionic surfactant (A) in comparative example C5 or anionic surfactant (B) in comparative example C6: for example at 50° C. and 10 s$^{-1}$ one obtained 4110 mPas (example 4) compared to 11960 mPas (example C5) or compared to 7290 mPas (example C6). In addition, flow behavior in examples 1-4 at 50° C. and at low shear is much better compared to the flow behavior in comparative examples C5 and C6 at 50° C. and at low shear.

In the next chapter the dissolution behavior of the concentrates described before in saline water are discussed. To a saline water comprising 26100 ppm of total dissolved salt, fixed amount of concentrate was given at 20° C. and mixture was stirred at 100 rounds per minute.

TABLE 2

Test results for dissolution of concentrate of anionic surfactant (A)/anionic surfactant (B)

| Ex. | Surfactant concentrate | Appearance of 0.52% by weight of surfactant concentrate (equals to 0.3% by weight of active material, which means the pure surfactants) in 26100 ppm TDS (20000 ppm $Na_2CO_3$ combined with 6100 ppm of salt mixture comprising mainly NaCl and $NaHCO_3$, no multivalent cations present) after stirring with 100 rpm (rounds per minute) at 20° C. for 4 mins | 0.52% by weight of surfactant concentrate (equals to 0.3% by weight of active material, which means the pure surfactants) in 26100 ppm TDS (20000 ppm $Na_2CO_3$ combined with 6100 ppm of salt mixture comprising mainly NaCl and $NaHCO_3$, no multivalent cations present) |
|---|---|---|---|
| 1 | Concentrate of ca. 9:1 (by weight) mixture of C16C18—7 PO—$SO_4Na^a$ to C12C14—2 EO—$SO4Na^b$ [surfactant content in the concentrate was ca. 58% by weight, content of cosolvent butyl diethylene glycole was ca. 13% by weight, content of water was ca. 28% by weight, and salt content was less than 1% by weight]$^c$ | Completely dissolved | Clear solution |

$^a$corresponds to anionic surfactant (A) of general formula (I) $R^1$—O—$(CH_2C(CH_3)HO)_x$—$(CH_2CH_2O)_y$—$SO_3M$ with $R^1 = C_{16}H_{33}/C_{18}H_{37}$, x = 7, y = 0, and M = Na.
$^b$corresponds to anionic surfactant (B) of general formula (II) $R^2$—O—$(CH_2CH_2O)_z$—$SO_3M$ with $R^2 = C_{12}H_{25}/C_{14}H_{29}$, z = 2, and M = Na.
$^c$as described in example 3a) in 'Preparation of the mixture comprising anionic surfactant (A) and anionic surfactant (B)'

As can be seen in table 2 from examples 1, the claimed concentrate comprising claimed surfactant mixture of anionic surfactant (A) C16C18-7 PO-$SO_4$Na and anionic surfactant (B) C12C14-2 EO-SO4Na and the cosolvent butyl diethylene glycole and water can be rapidly dissolved in a 26100 ppm TDS (total dissolved salt) at 20° C. A clear solution is obtained.

In addition, solubility tests for different surfactant solutions are shown in table 3 and table 4. The surfactants can be e.g. dissolved in the following way, that one volume of saline water with 6100 ppm TDS comprising 0.6% by weight of dissolved surfactant formulation is mixed with same volume of saline water with 6100 ppm TDS comprising 60000 ppm of dissolved $Na_2CO_3$ at 20° C. (see table 3). Solution is afterwards heated to 62° C.

TABLE 3

Solubility of different surfactants in saline water with 36100 ppm TDS (total dissolved salt) at 20° C. and 62° C.

| Ex. | Surfactant formulation in saline water comprising 36100 ppm TDS (30000 ppm $Na_2CO_3$ combined with 6100 ppm of salt mixture comprising mainly NaCl and $NaHCO_3$, no multivalent cations present) | Appearance at 20° C. | Appearance at 62° C. |
|---|---|---|---|
| C1 | 0.30% by weight of C16C18—7 PO—$SO_4Na^a$, 0.08% of weight of butyl diethylene glycole | Clear solution | Cloudy and not homogeneous solution |
| 2 | 0.18% by weight of C16C18—7 PO—$SO_4Na^a$, 0.12% by weight of C12C14—2 EO—$SO4Na^b$, 0.04% of weight of butyl diethylene glycole | Clear solution | Clear solution |
| C3 | 0.15% by weight of C16C18—7BuO—7 PO—15 EO—$SO_4$Na, 0.15% by weight of iC13—6 EO—H, 0.09% of weight of butyl diethylene glycole | Slightly scattering solution | Scattering but homogeneous solution |
| C4 | 0.18% by weight of C16C18—7 PO—$SO_4Na^a$, 0.12% by weight of iC13—6 EO—H, 0.04% of weight of butyl diethylene glycole | Slightly scattering solution | Cloudy and not homogeneous solution |
| 5 | 0.18% by weight of C16C18—22 PO—$SO_4Na^c$, 0.12% by weight of C12C14—2 EO—$SO4Na^b$ | Clear solution | Clear solution |
| 6 | 0.18% by weight of C16C18—15 PO—7 EO—$SO_4Na^d$, 0.12% by weight of C12C14—2 EO—$SO4Na^b$ | Clear solution | Clear solution |

$^a$corresponds to anionic surfactant (A) of general formula (I) $R^1$—O—$(CH_2C(CH_3)HO)_x$—$(CH_2CH_2O)_y$—$SO_3M$ with $R^1 = C_{16}H_{33}/C_{18}H_{37}$, x = 7, y = 0, and M = Na.
$^b$corresponds to anionic surfactant (B) of general formula (II) $R^2$—O—$(CH_2CH_2O)_z$—$SO_3M$ with $R^2 = C_{12}H_{25}/C_{14}H_{29}$, z = 2, and M = Na.
$^c$corresponds to anionic surfactant (A) of general formula (I) $R^1$—O—$(CH_2C(CH_3)HO)_x$—$(CH_2CH_2O)_y$—$SO_3M$ with $R^1 = C_{16}H_{33}/C_{18}H_{37}$, x = 22, y = 0, and M = Na.
$^d$corresponds to anionic surfactant (A) of general formula (I) $R^1$—O—$(CH_2C(CH_3)HO)_x$—$(CH_2CH_2O)_y$—$SO_3M$ with $R^1 = C_{16}H_{33}/C_{18}H_{37}$, x = 15, y = 7, and M = Na.

As can be seen in table 3 from comparative examples C1, the anionic surfactant (A) C16C18-7 PO-SO$_4$Na in presence of cosolvent butyl diethylene glycole is soluble at 20° C. in saline water with 36100 ppm TDS but not soluble anymore at 62° C. In contrast to that, the claimed surfactant mixture of anionic surfactant (A) C16C18-7 PO-SO$_4$Na and anionic surfactant (B) C12C14 -2 EO-SO4Na and of cosolvent butyl diethylene glycole gives under same conditions a much better behavior as shown in example 2: at 20° C. and at 62° C. a clear solution is obtained. Comparative example C3 shows a different surfactant system comprising an anionic surfactant C16C18-7BuO-7PO-15EO-SO4Na (from prior art WO 11110503 A1) and a nonionic surfactant iC13-6EO-H (equals to Lutensol® TO6 from BASF). Observed solution behavior is not ideal, but acceptable: at 20° C. and at 62° C. scattering but homogeneous solutions were obtained. Comparative example C4 shows, that the combination of anionic surfactant (A) C16C18-7 PO-SO$_4$Na with the nonionic surfactant iC13-6EO-H (equals to Lutensol® TO6 from BASF) is inferior compared to claimed surfactant mixture described in example 2: while in example 2 clear solution was obtained at 62° C., a cloudy and not homogeneous solution was observed in example C4. Injection of a cloudy and not homogeneous solution would lead to separation of material (surfactant could not pump to the oil, but would stuck in the formation) and could even plug the injection area. Example 5 and 6 show, that also other claimed surfactant mixtures lead to clear solutions at 36100 ppm TDS and at 20° C. or 62° C.: anionic surfactant (A) C16C18-22 PO-SO4Na and anionic surfactant (B) C12C14-2 EO-SO4Na or anionic surfactant (A) C16C18-15 PO-7 EO-SO4Na and anionic surfactant (B) C12C14-2 EO-SO4Na give clear solutions.

TABLE 4

Solubility of different surfactants in saline water with 26100 ppm TDS (total dissolved salt) at 20° C. and 62° C.

| Ex. | Surfactant formulation in saline water comprising 26100 ppm TDS (20000 ppm Na$_2$CO$_3$ combined with 6100 ppm of salt mixture comprising mainly NaCl and NaHCO$_3$, no multivalent cations present) | Appearance at 20° C. | Appearance at 62° C. |
|---|---|---|---|
| 1 | 0.27% by weight of C16C18 —7 PO—SO$_4$Na$^a$, 0.03% by weight of C12C14—2 EO—SO4Na$^b$, 0.07% of weight of butyl diethylene glycole | Clear solution | Clear solution |
| 2 | 0.18% by weight of C16C18—7 PO—SO$_4$Na$^a$, 0.12% by weight of C12C14—2 EO—SO4Na$^b$, 0.04% of weight of butyl diethylene glycole | Clear solution | Clear solution |
| C3 | 0.18% by weight of C16C18—7 PO—SO$_4$Na$^a$, 0.12% by weight of iC13—6 EO—H, 0.04% of weight of butyl diethylene glycole | Clear solution | Cloudy and not homogeneous solution |

$^a$corresponds to anionic surfactant (A) of general formula (I) R$^1$—O—(CH$_2$C(CH$_3$)HO)$_x$—(CH$_2$CH$_2$O)$_y$—SO$_3$M with R$^1$ = C$_{16}$H$_{33}$/C$_{18}$H$_{37}$, x = 7, y = 0, and M = Na.
$^b$corresponds to anionic surfactant (B) of general formula (II) R$^2$—O—(CH$_2$CH$_2$O)$_z$—SO$_3$M with R$^2$ = C$_{12}$H$_{25}$/C$_{14}$H$_{29}$, z = 2, and M = Na.

As can be seen in table 4 from examples 1 and 2, the claimed surfactant mixture of anionic surfactant (A) C16C18-7 PO-SO4Na and anionic surfactant (B) C12C14-2 EO-SO4Na and of cosolvent butyl diethylene glycole gives also at lower salinity (26100 ppm TDS in table 4 compared to 36100 ppm TDS in table 3) a good solubility behavior: at 20° C. and at 62° C. a clear solution is obtained. Comparative example C3 shows, that the combination of anionic surfactant (A) C16C18-7 PO-SO4Na with the nonionic surfactant iC13-6EO-H (equals to Lutensol® TO6 from BASF) is inferior compared to claimed surfactant mixture described in example 2: while in example 2 clear solution was obtained at 62° C., a cloudy and not homogeneous solution was observed in example C4. Injection of a cloudy and not homogeneous solution would lead to separation of material (surfactant could not pump to the oil, but would stuck in the formation) and could even plug the injection area.

In the next chapter, reduction of interfacial tension between saline water and crude oil is investigated (see table 5). A crude oil, which is rich in paraffin and solidifies at 50° C. is used. API degree of crude oil is <29. Measurements (spinning drop method) are done at reservoir temperature of 62° C.

TABLE 5

Interfacial tensions against crude oil in the presence of anionic surfactant (A)/anionic surfactant (B)

| Example | Surfactant formulation | Salt solution | IFT at 62° C. | Surfactant solubility in the salt solution at 62° C. |
|---|---|---|---|---|
| 1 | 0.18% by weight of C16C18—7 PO—SO4Na$^a$, 0.12% by weight of C12C14—2 EO—SO4Na$^b$, 0.04% of weight of butyl diethylene glycole | 30000 ppm Na$_2$CO$_3$ combined with 6100 ppm of salt mixture comprising mainly NaCl and NaHCO$_3$, no multivalent cations present | 0.002 mN/m | Clear soluble |
| 2 | 0.27% by weight of C16C18—7 PO—SO4Na$^a$, 0.03% by weight of C12C14—2 EO— SO4Na$^b$, 0.07% of weight of butyl diethylene glycole | 20000 ppm Na$_2$CO$_3$ combined with 6100 ppm of salt mixture comprising mainly NaCl and NaHCO$_3$, no multivalent cations present | 0.004 mN/m | Clear soluble |
| 3 | 0.27% by weight of C16C18—7 PO—SO4Na$^a$, 0.03% by weight of C12C14—2 EO—SO4Na$^b$, 0.07% of weight of butyl diethylene glycole | 15000 ppm Na$_2$CO$_3$ combined with 6100 ppm of salt mixture comprising mainly NaCl and NaHCO$_3$, no multivalent cations present | 0.007 mN/m | Clear soluble |
| 4 | 0.12% by weight of C16C18—7 PO—SO4Na$^a$, 0.08% by weight of C12C14—2 EO—SO4Na$^b$, 0.03% of weight of butyl diethylene glycole | 25000 ppm Na$_2$CO$_3$ combined with 6100 ppm of salt mixture comprising mainly NaCl and NaHCO$_3$, no multivalent cations present | 0.006 mN/m | Clear soluble |
| 5 | 0.18% by weight of C16C18—7 PO—SO4Na$^a$, 0.02% by weight of C12C14—2 EO—SO4Na$^b$, 0.05% of weight of butyl diethylene glycole | 25000 ppm Na$_2$CO$_3$ combined with 6100 ppm of salt mixture comprising mainly NaCl and NaHCO$_3$, no multivalent cations present | 0.001 mN/m | Clear soluble |
| 6 | 0.18% by weight of C16C18—7 PO—SO4Na$^a$, 0.02% by weight of C12C14—2 EO—SO4Na$^b$, 0.05% of weight of butyl diethylene glycole | 20000 ppm Na$_2$CO$_3$ combined with 6100 ppm of salt mixture comprising mainly NaCl and NaHCO$_3$, no multivalent cations present | 0.003 mN/m | Clear soluble |

$^a$corresponds to anionic surfactant (A) of general formula (I) R$^1$—O—(CH$_2$C(CH$_3$)HO)$_x$—(CH$_2$CH$_2$O)$_y$—SO$_3$M with R$^1$ = C$_{16}$H$_{33}$/C$_{18}$H$_{37}$, x = 7, y = 0, and M = Na.
$^b$corresponds to anionic surfactant (B) of general formula (II) R$^2$—O—(CH$_2$CH$_2$O)$_z$—SO$_3$M with R$^2$ = C$_{12}$H$_{25}$/C$_{14}$H$_{29}$, z = 2, and M = Na.

As can be seen in table 5 from examples 1 to 6, the claimed surfactant mixture of anionic surfactant (A) C16C18-7 PO-SO4Na and anionic surfactant (B) C12C14-2 EO-SO4Na and of cosolvent butyl diethylene glycole gives at different salinities (15000 -30000 ppm Na$_2$CO$_3$ combined with 6100 ppm salt mixture comprising mainly NaCl and NaHCO3, no multivalent cations present), at different surfactant ratio (9:1 or 6:4 by weight of anionic surfactant (A) to anionic surfactant (B); example 2,3,5 and 6 compared to example 1 and 4), and at different concentration (0.2% to 0.3% by weight of anionic surfactant (A) to anionic surfactant (B); example 4-6 compared to example 1 -3) a desired ultralow interfacial tension of <0.01 mN/m at 62° C. In addition, all surfactant solutions are clear soluble at 62° C. in described saline waters.

Finally, core flood tests with sandstone cores were done in order to determine oil mobilization rate and adsorption rate of described surfactant formulations in presence of anionic polyacrylamide (aPAM; aPAM is used for for mobility control). Bentheimer sandstone cores (12.01 in×1.49 in; porosity 24%; 82 ml pore volume) were used for core flood tests at 62° C. The cores were saturated with saline water. Brine permeability (with use of tracer) was determined: ca. 2100 mD for all the cores. Crude oil (rich in paraffin) was injected into the cores at 62° C. and aged. Then, water flooding was started. The water recovery efficiency (amount of oil produced by water flooding) was in all cores in a very similar range: 53-58% original oil in place. Alkali-surfactant-polymer slug (0.3 pore volume) were injected, followed by alkali-polymer slugs. Table 6 shows the results for different surfactant formulations.

TABLE 6

Oil mobilization rate and adsorption rate of surfactant formulations in presence of aPAM (3000 ppm) at 62° C. in sandstone core comprising crude oil rich in paraffin and saline water

| Example | Surfactant formulation | Salt solution | Surfactant adsorption | Cumulative oil recovered |
|---|---|---|---|---|
| 1 | 0.18% by weight of C16C18—7 PO—SO$_4$Na$^a$, 0.12% by weight of C12C14—2 EO—SO4Na$^b$, 0.04% of weight of butyl diethylene glycole | 30000 ppm Na$_2$CO$_3$ combined with 6100 ppm of salt mixture comprising mainly NaCl and NaHCO$_3$, no multivalent cations present | 0.036 mg surfactant per g rock | 97.9% original oil in place |
| 2 | 0.27% by weight of C16C18—7 PO—SO$_4$Na$^a$, 0.03% by weight of C12C14—2 EO—SO4Na$^b$, 0.07% of weight of butyl diethylene glycole | 20000 ppm Na$_2$CO$_3$ combined with 6100 ppm of salt mixture comprising mainly NaCl and NaHCO$_3$, no multivalent cations present | 0.035 mg surfactant per g rock | 98.4% original oil in place |
| 3 | 0.18% by weight of C16C18—7 PO—SO$_4$Na$^a$, 0.02% by weight of C12C14—2 EO—SO4Na$^b$, 0.05% of weight of butyl diethylene glycole | 20000 ppm Na$_2$CO$_3$ combined with 6100 ppm of salt mixture comprising mainly NaCl and NaHCO$_3$, no multivalent cations present | 0.026 mg surfactant per g rock | 97.5% original oil in place |
| C4 | 0.15% by weight of C16C18—7BuO—7 PO—15 EO—SO$_4$Na, 0.15% by weight of iC13—6 EO—H, 0.09% of weight of butyl diethylene glycole | 20000 ppm Na$_2$CO$_3$ combined with 6100 ppm of salt mixture comprising mainly NaCl and NaHCO$_3$, no multivalent cations present | 0.104 mg surfactant per g rock | 80.3% original oil in place |

$^a$corresponds to anionic surfactant (A) of general formula (I) R$^1$—O—(CH$_2$C(CH$_3$)HO)$_x$—(CH$_2$CH$_2$O)$_y$—SO$_3$M with R$^1$ = C$_{16}$H$_{33}$/C$_{18}$H$_{37}$, x = 7, y = 0, and M = Na.
$^b$corresponds to anionic surfactant (B) of general formula (II) R$^2$—O—(CH$_2$CH$_2$O)$_z$—SO$_3$M with R$^2$ = C$_{12}$H$_{25}$/C$_{14}$H$_{29}$, z = 2, and M = Na.

As can be seen in table 6 from examples 1 to 3, the claimed surfactant mixture of anionic surfactant (A) C16C18-7 -PO-SO4Na and anionic surfactant (B) C12C14-2 EO-SO4Na and of cosolvent butyl diethylene glycole gives at different salinities (20000-30000 ppm Na$_2$CO$_3$ combined with 6100 ppm salt mixture comprising mainly NaCl and NaHCO$_3$, no multivalent cations present), at different surfactant ratio (9:1 or 6:4 by weight of anionic surfactant (A) to anionic surfactant (B); example 2-3 compared to example 1), and at different concentration (0.2% to 0.3% by weight of anionic surfactant (A) to anionic surfactant (B); example 3 compared to example 1-2) a surprisingly high cumulative oil recovery (total volume of oil recovered) of ≥97.5% original oil in place. At the same time, the surfactant adsorption rate is with <0.05 mg per g rock astonishingly low. Comparative example C4 shows a different surfactant system comprising an anionic surfactant C16C18-7BuO-7PO-15EO-SO4Na (from prior art WO 11110503 A1) and a nonionic surfactant iC13-6EO-H (equals to Lutensol® TO6 from BASF). The results are good (0.1 mg surfactant per g rock adsorbed, cumulative oil recovery in range of 80% original oil in place), but inferior compared to surprisingly good results from example 1-3. Lower surfactant adsorption rate and higher cumulative oil recovery are beneficial to make the chemical enhanced oil recovery process more economic and more attractive for the operator.

Not shown in table 6 is the ASP incremental oil recovery (additional oil recovered at one pore volume after alkali-surfactant-polymer injection end):
  Example 1: 36.4% original oil in place
  Example 2: 40.0% original oil in place
  Example 3: 40.6% original oil in place
  Comparative example C4: 19.8% original oil in place This shows, that in example 1-3 huge majority of the oil mobilized by chemicals is obtained within first pore volume. This beneficial for an operator (fast oil production, fast return on investment). In comparative example C4, a significant amount of oil is obtained later.

In the following, comparison examples are provided in view of the teaching of US 2016/0215200 A1. In paragraph [0129] of US 2016/0215200 A1, it is mentioned that "a hydrocarbon recovery composition may include an inorganic salt (e.g. sodium carbonate (Na2CO3), sodium chloride (NaCl), or calcium chloride (CaCl$_2$))". In claim 13 of US 2016/0215200 A1 it is described, that "the brine has a hardness of at least 0.5 wt %". In table 2 of US 2016/0215200 A1, a synthetic sea water is described, which comprises 2.7 weight-% NaCl, 0.13 weight-% CaCl$_2$, 1.12 weight-% MgCl$_2$×6 H$_2$O, and 0.48 weight-% Na$_2$SO$_4$, which were used for the tests described in US 2016/0215200 A1.

Synthetic sea water from table 2 of US 2016/0215200 A1 without Na$_2$CO$_3$ at 20° C. was prepared and was clear, whereas addition of 20000 ppm Na$_2$CO$_3$ at 20° C. immediately led to a clouding. After a storage time of 44 h at 20° C. a massive precipitate occurred, when sodium carbonate was combined with synthetic sea water and stored for roughly 2 days.

Such a clouding or precipitation is very critical as it can plug the porous reservoir, which can negatively affect the oil production. US 2016/0215200 A1 does not teach, how to overcome such a clouding or precipitation.

US 2016/0215200 A1 describes the combination of an alkyl propoxy sulfate with a second anionic surfactant out of the group of alkyl propoxy ethoxy sulfate or out of the group of alkyl ethoxy sulfate. In chapter [0056] of US 2016/0215200 it is described, that the second anionic surfactant should most preferably comprises at least 6 alkoxy units. In chapter [0057] of US 2016/0215200 A1 it is described, that the number of alkoxy units should not to be too small. In table 4 and table 5 of US 2016/0215200 A1, alkyl ethoxy sulfates with 7 ethoxy units are described (iC13-7 EO-Sulfate and C12C13-7 EO-Sulfate). They were combined The reduction of interfacial tension between saline water and crude oil is investigated (see table 7). A crude oil, which is rich in paraffin and solidifies at 50° C. is used. API degree of crude oil is <29. Measurements (spinning drop method) are done at reservoir temperature of 62° C.

TABLE 7

Interfacial tensions against crude oil in the presence of anionic surfactant (A)/anionic surfactant (B) and comparison with surfactants claimed by US 2016/0215200 A1

| Example | Surfactant formulation | Salt solution | IFT at 62° C. | Surfactant solubility in the salt solution at 62° C. |
|---|---|---|---|---|
| C1 | 0.255% by weight of iC16—7 PO—SO$_4$Na, 0.045% by weight of iC12—7 EO—SO4Na | Synthetic seawater as described in table 2 of US 2016/0215200 | Not determined due to solubility issues | Very scattering till slight clouding |
| C2 | 0.15% by weight of iC16—7 PO—SO$_4$Na, 0.15% by weight of iC12—7 EO—SO4Na | Synthetic seawater as described in table 2 of US 2016/0215200 | 0.187 mN/m | Clear soluble |
| C3 | 0.15% by weight of iC16—7 PO—SO$_4$Na, 0.15% by weight of iC12—7 EO—SO4Na | Synthetic seawater as described in table 2 of US 2016/0215200 diluted with distilled water to a salinity of 31100 ppm TDS | 0.225 mN/m | Clear soluble |
| C4 | 0.25% by weight of iC12—7 PO—SO$_4$Na, 0.05% by weight of iC12—7 EO—SO4Na | Synthetic seawater as described in table 2 of US 2016/0215200 | 0.168 mN/m | Clear soluble |
| 5 | 0.18% by weight of C16C18—7 PO—SO$_4$Na$^a$, 0.02% by weight of C12C14—2 EO—SO4Na$^b$, 0.05% of weight of butyl diethylene glycole | 25000 ppm Na$_2$CO$_3$ combined with 6100 ppm of salt mixture comprising mainly NaCl and NaHCO$_3$, no multivalent cations present | 0.001 mN/m | Clear soluble |
| C6 | 0.25% by weight of iC12—7 PO—SO$_4$Na, 0.05% by weight of iC12—7 EO—SO4Na | 25000 ppm Na$_2$CO$_3$ combined with 6100 ppm of salt mixture comprising mainly NaCl and NaHCO$_3$, no multivalent cations present | 0.118 mN/m | Clear soluble |

$^a$corresponds to anionic surfactant (A) of general formula (I) R$^1$—O—(CH$_2$C(CH$_3$)HO)$_x$—(CH$_2$CH$_2$O)$_y$—SO$_3$M with R$^1$ = C$_{16}$H$_{33}$/C$_{18}$H$_{37}$, x = 7, y = 0, and M = Na.
$^b$corresponds to anionic surfactant (B) of general formula (II) R$^2$—O—(CH$_2$CH$_2$O)$_z$—SO$_3$M with R$^2$ = C$_{12}$H$_{25}$/C$_{14}$H$_{29}$, z = 2, and M = Na.

with the alkyl propoxy sulfate C16C17-7 PO-Sulfate. Chapter [0151] and table 5 of US 2016/0215200 A1 show, that these combinations (C16C17-7 PO-Sulfate with iC13-7 EO-Sulfate or C16C17-7 PO-Sulfate with C12C13-7 EO-Sulfate) are used at concentrations of at least 1 weight-%, at room temperature and in synthetic sea water. It was claimed, that these are the optimal blends. For a higher salinity (2× seawater) such combinations did not provide optimal blends at room temperature as shown in table 5 of US 2016/0215200 A1. Chapter [0160] of US 2016/0215200 A1 shows, that ata higher temperature of 50° C. a different surfactant combination C12C13 -7 PO-Sulfate and C12C13-7 EO-Sulfate (ratio 83:17) was chosen to be an optimum blend (see example 2 of US 2016/0215200: 0.6 wt % surfactant concentration was used and salinities around sea water were screened in phase behavior tests with crude oil at 50° C.).

According to the description within claim 1 of US 2016/0215200 A1 following surfactants were synthesized and compared:
iC16-7 PO-Sulfate (iC16 is alkyl moiety 2-hexyldecyl and has a branching degree of 1)
iC12-7 PO-Sulfate (iC12 is alkyl moiety 2-butyloctyl and has a branching degree of 1)
iC12-7 EO-Sulfate (iC12 is alkyl moiety 2-butyloctyl and has a branching degree of 1)

As shown in table 7 only surfactant formulation described in example 5 provided a desired ultralow interfacial tension against the crude oil at 62° C. The other comparative examples C1-C4 and C6 comprise surfactant formulations claimed in US 2016/0215200 A1. Investigations were started with synthetic seawater described in US 2016/0215200 A1. As shown in comparative example C1, 3000 ppm of a 85:15 ratio of iC16-7P-Sulfate to iC12-7 EO-Sulfate was not sufficient soluble at 62° C. There ratio was changed to 1:1 and clear solution was obtained (see C2), but interfacial tension remained above 0.1 mN/m. A reduction in salinity to 31100 ppm TDS (see C3) did not improve reduction of interfacial tension further. Another surfactant combination claimed by US 2016/0215200 A1 was used as it was used at elevated temperatures: 3000 ppm of a 83:17 ratio of iC12-7PO-Sulfate to iC12-7 EO-Sulfate. In contrast to comparative example C1, such surfactant formulation with an excess of the alkyl propoxy sulfate—used in comparative example C4—did not have solubility issues. However, interfacial tension remained still above 0.1 mN/m. However, another trial was started and Na$_2$CO$_3$ was used instead of the synthetic seawater. As shown in comparative example C6, the interfacial tension reduction was improved only slightly and remained above 0.1 mN/m. Under identical conditions, the claimed surfactant formulation of this intellectual property described in example 5 led to the desired results.

In addition, further surfactants were synthesized and tested. The reduction of interfacial tension between saline water and crude oil is investigated (see table 8). A crude oil, which is rich in paraffin and solidifies at 50° C. is used. API degree of crude oil is <29. Measurements (spinning drop method) are done at reservoir temperature of 62° C. and values noted (e.g. after 1 h).

TABLE 8

Interfacial tensions against crude oil in the presence of anionic surfactant (A)/anionic surfactant (B)

| Example | Surfactant formulation | Salt solution | IFT at 62° C. | Surfactant solubility in the salt solution at 62° C. |
|---|---|---|---|---|
| 1 | 0.27% by weight of C16C18—7 PO—SO$_4$Na$^a$, 0.03% by weight of C12C14—4 EO—SO4Na$^f$, 0.07% of weight of butyl diethylene glycole | 25000 ppm Na$_2$CO$_3$ combined with 6100 ppm of salt mixture comprising mainly NaCl and NaHCO$_3$, no multivalent cations present | 0.005 mN/m | Clear soluble |
| 2 | 0.27% by weight of C16C18—7 PO—5 EO—SO$_4$Na$^e$, 0.03% by weight of C12C14—2 EO—SO4Na$^b$, 0.07% of weight of butyl diethylene glycole | 25000 ppm Na$_2$CO$_3$ combined with 6100 ppm of salt mixture comprising mainly NaCl and NaHCO$_3$, no multivalent cations present | 0.004 mN/m | Clear soluble |
| 3 | 0.18% by weight of C16C18—7 PO—SO$_4$Na$^a$, 0.02% by weight of C12C14—4 EO—SO4Na$^f$, 0.05% of weight of butyl diethylene glycole | 25000 ppm Na$_2$CO$_3$ combined with 6100 ppm of salt mixture comprising mainly NaCl and NaHCO$_3$, no multivalent cations present | 0.006 mN/m | Clear soluble |
| 4 | 0.18% by weight of C16C18—7 PO—5 EO—SO$_4$Na$^e$, 0.02% by weight of C12C14—2 EO—SO4Na$^b$, 0.05% of weight of butyl diethylene glycole | 25000 ppm Na$_2$CO$_3$ combined with 6100 ppm of salt mixture comprising mainly NaCl and NaHCO$_3$, no multivalent cations present | 0.003 mN/m | Clear soluble |

$^a$corresponds to anionic surfactant (A) of general formula (I) R$^1$—O—(CH$_2$C(CH$_3$)HO)$_x$—(CH$_2$CH$_2$O)$_y$—SO$_3$M with R$^1$ = C$_{16}$H$_{33}$/C$_{18}$H$_{37}$, x = 7, y = 0, and M = Na.
$^b$corresponds to anionic surfactant (B) of general formula (II) R$^2$—O—(CH$_2$CH$_2$O)$_z$—SO$_3$M with R$^2$ = C$_{12}$H$_{25}$/C$_{14}$H$_{29}$, z = 2, and M = Na.
$^e$corresponds to anionic surfactant (A) of general formula (I) R$^1$—O—(CH$_2$C(CH$_3$)HO)$_x$—(CH$_2$CH$_2$O)$_y$—SO$_3$M with R$^1$ = C$_{16}$H$_{33}$/C$_{18}$H$_{37}$, x = 7, y = 5, and M = Na.
$^f$corresponds to anionic surfactant (B) of general formula (II) R$^2$—O—(CH$_2$CH$_2$O)$_z$—SO$_3$M with R$^2$ = C$_{12}$H$_{25}$/C$_{14}$H$_{29}$, z = 4, and M = Na As shown in table 8 several other claimed surfactant combinations gave clear solutions under reservoir conditions and led to ultralow interfacial tension values in presence of crude oil (example 1-4: 0.003-0.006 mN/m) at low surfactant concentrations <<1 wt % (example 1-4: 0.2-0.3 wt %). Compared to surfactant combinations from table 5, anionic surfactant (A) of general formula (I) has an additional EO block (example 2 and 4: y=5) or anionic surfactant (B) of general formula (II) has a longer EO block (example 1 and 3: z=4). This demonstrates, that a broader range of surfactants can be used.

The invention claimed is:

1. A method for producing mineral oil from underground mineral oil deposits, in which an aqueous saline surfactant formulation comprising a surfactant mixture, for the purpose of lowering the interfacial tension between oil and water to <0.1 mN/m at deposit temperature is injected through at least one injection well into a mineral oil deposit and crude oil is withdrawn through at least one production well from the deposit, wherein the surfactant mixture comprises at least one anionic surfactant (A) of the general formula (I)

$$R^1—O—(CH_2C(CH_3)HO)_x—(CH_2CH_2O)_y—SO_3M \quad (I)$$

and at least one anionic surfactant (B) of the general formula (II)

$$R^2—O—(CH_2CH_2O)_z—SO_3M \quad (II),$$

where a ratio of anionic surfactant (A) to anionic surfactant (B) of 99:1 to 51:49 by weight is present in the surfactant mixture, where
R$^1$ is a primary linear, saturated or unsaturated, aliphatic hydrocarbyl radical having 16 to 18 carbon atoms; and
R$^2$ is a primary linear, saturated aliphatic hydrocarbyl radical having 12 to 17 carbon atoms; and
M is Na, K, NH$_4$, or NH(CH$_2$CH$_2$OH)$_3$; and
x is a number from 3 to 25; and
y is a number from 0 to 20; and
z is a number from 1 to 30;
where the sum total of x+y is a number from 3 to 35 and the x+y alkoxylate groups may be arranged in random distribution, in alternation or in blocks
and wherein the aqueous saline surfactant formulation further comprises a base or a mixture of two or more of these bases.

2. The method according to claim 1, wherein the concentration of the surfactant mixture is 0.03% to 0.99% by weight based on the total amount of the aqueous saline surfactant formulation.

3. The method according to claim 1, wherein the ratio of anionic surfactant (A) to anionic surfactant (B) is 95:5 to 55:45 by weight.

4. The method according to claim 1, wherein the aqueous saline surfactant formulation further comprises a base, which is selected from carbonates.

5. The method according to claim 1, wherein at least one of the following conditions is fulfilled:
M is Na;
x is a number from 3 to 15;
y is a number from 0 to 10;
z is a number from 1 to 5;
the sum total of x+y is a number from 3 to 25.

6. The method of claim 5, wherein
$R^1$ is a primary linear, saturated, aliphatic hydrocarbyl radical having 16 to 18 carbon atoms;
$R^2$ is a primary linear saturated aliphatic hydrocarbyl radical having 12 to 14 carbon atoms;
M is Na;
x is a number from 3 to 15;
y is a number from 0 to 10;
z is a number from 1 to 5; and
the sum total of x+y is a number from 3 to 25.

7. The method according to claim 6, wherein z is a number from 1 to 5.

8. The method according to claim 1, wherein the aqueous surfactant formulation further comprises a thickening polymer.

9. The method according to claim 1, wherein the underground mineral oil deposit consists of sandstone and deposit temperature is below 90° C.

10. The method according to claim 1, wherein the aqueous saline surfactant formulation is prepared from a concentrate comprising the surfactant mixture as described in claim 1 and at least softened water and/or a cosolvent.

11. The method according to claim 10, where
a) the cosolvent is selected from the group of the aliphatic alcohols having 3 to 8 carbon atoms or from the group of the alkyl monoethylene glycols, the alkyl diethylene glycols or the alkyl triethylene glycols, where the alkyl radical is an aliphatic hydrocarbyl radical having 3 to 6 carbon atoms; and/or
b) the concentrate has a viscosity of <15000 mPas at 50° C. and at 10 s$^{-1}$; and/or
c) the amount of cosolvent by weight is equal or lower compared to the amount of water by weight.

12. An aqueous saline surfactant formulation as described in claim 1.

13. An aqueous saline surfactant formulation according to claim 12, wherein the surfactant mixture of anionic surfactant (A) of the general formula (I) and anionic surfactant (B) of the general formula (II) are produced in that the anionic surfactant (A) and anionic surfactant (B) are made separately by alkoxylation of alcohols $R^1OH$ and $R^2OH$ in a vessel followed by sulphation with sulfur trioxide in a falling film reactor including neutralization step afterwards and mixed finally.

14. A concentrate comprising a surfactant mixture as described in claim 1, and further comprising at least softened water and/or a cosolvent.

15. The concentrate of claim 14, wherein the concentrate comprises 50% by weight to 90% by weight of the surfactant mixture, 5% by weight to 30% by weight of softened water and 5% by weight to 20% by weight of a cosolvent, based on the total amount of the concentrate.

16. The concentrate of claim 14, where
a) the cosolvent is selected from the group of the alkyl monoethylene glycols, the alkyl diethylene glycols or the alkyl triethylene glycols, where the alkyl radical is a primary linear saturated aliphatic hydrocarbyl radical having 4 carbon atoms; and/or
b) the concentrate has a viscosity of <15000 mPas at 50° C. and at 10 s$^{-1}$ and/or
c) the amount of cosolvent by weight is equal or lower compared to the amount of water by weight.

* * * * *